(12) United States Patent
Sato et al.

(10) Patent No.: US 9,317,539 B2
(45) Date of Patent: Apr. 19, 2016

(54) TIME-SERIES DATABASE SETUP AUTOMATIC GENERATION METHOD, SETUP AUTOMATIC GENERATION SYSTEM AND MONITORING SERVER

(71) Applicant: HITACHI, LTD., Tokyo (JP)

(72) Inventors: Tatsuya Sato, Tokyo (JP); Masahiro Yoshizawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 221 days.

(21) Appl. No.: 14/089,158

(22) Filed: Nov. 25, 2013

(65) Prior Publication Data
US 2014/0149466 A1 May 29, 2014

(30) Foreign Application Priority Data

Nov. 27, 2012 (JP) .................................. 2012-258119

(51) Int. Cl.
G06F 7/00 (2006.01)
G06F 17/30 (2006.01)

(52) U.S. Cl.
CPC .............................. *G06F 17/30289* (2013.01)

(58) Field of Classification Search
None
See application file for complete search history.

(56) References Cited

U.S. PATENT DOCUMENTS

| 2005/0223022 | A1* | 10/2005 | Weissman | G06F 17/30607 |
| 2010/0306151 | A1* | 12/2010 | Bickel | G01D 4/002 706/46 |
| 2010/0325314 | A1* | 12/2010 | Onuki | G06F 3/0605 710/5 |
| 2012/0158714 | A1* | 6/2012 | Dumant | G06F 17/30336 707/728 |

FOREIGN PATENT DOCUMENTS

| JP | 06-215037 A | 8/1994 |
| JP | 07-085093 A | 3/1995 |
| JP | 10-111819 A | 4/1998 |
| JP | 2003-228570 A | 8/2003 |
| JP | 2011-134342 A | 7/2011 |

* cited by examiner

*Primary Examiner* — Tuan A Pham
(74) *Attorney, Agent, or Firm* — Mattingly & Malur, PC

(57) ABSTRACT

If the operations manager makes configuration changes of the log database through configuration management interface, the configuration management interface records configuration information thereof on an management database. Furthermore, when log data of a monitoring target device are collected in a log collection unit through the log database, a log data volume analysis unit reads utilization information of data volume of the log database, and records the reading on a management database. A configuration changes proposal generating unit automatically generates configuration changes proposal of the log database based on the information recorded on the management database. Moreover, a metrics value for evaluating time required for configuration changes, a metrics value for evaluating performance in connection with the configuration changes, and a metrics value for evaluating the data volume in connection with the configuration changes are calculated, and an effect and an influence of changes proposal are presented to the operations manager.

9 Claims, 26 Drawing Sheets

FIG. 3

MONITORING TARGET T120

| | T102 | T103 | T104 | T105 | T106 | T112 |
|---|---|---|---|---|---|---|
| | TENANT | LOG MEASUREMENT TIME | DATA TYPE NAME | INSTANCE NAME | OPTIONAL DATA | BYTE COUNT |
| T150 | TENANT A | 7:00:00 3/30/2012 | WEB EVENT LOG OF SERVICE 1 | ap1server1 | "EVENT NAME"="Action1" "REQUEST PROCESSING TIME"= 3,000 MILLISECONDS . . . | 500B |
| T151 | TENANT A | 7:01:00 3/30/2012 | WEB EVENT LOG OF SERVICE 1 | ap1server1 | "EVENT NAME"="Action1" "REQUEST PROCESSING TIME"= 5,000 MILLISECONDS . . . | 450B |
| T152 | TENANT A | 7:03:00 3/30/2012 | WEB EVENT LOG OF SERVICE 1 | ap1server2 | "EVENT NAME"="Action1" "REQUEST PROCESSING TIME"= 2,000 MILLISECONDS . . . | 600B |
| T153 | TENANT A | 7:04:00 3/30/2012 | WEB EVENT LOG OF SERVICE 2 | ap1server1 | "EVENT NAME"="Action1" "CLIENT NAME"="ABC CORPORATION" . . . | 500B |
| T154 | TENANT A | 7:10:00 3/30/2012 | CPU UTILIZATION RATE OF OS | ap1server1 | "CPU UTILIZATION RATE" | 50B |

T100

F I G . 4

| TENANT T201 | DATA TYPE NAME T202 | INSTANCE NAME T203 | COMPRESSION START TARGET TIME T204 | COMPRESSION END TARGET TIME T205 | COMPRESSION TARGET DATA COUNT T206 | COMPRESSED DATA T207 | BYTE COUNT BEFORE COMPRESSION T208 | BYTE COUNT AFTER COMPRESSION T209 | |
|---|---|---|---|---|---|---|---|---|---|
| TENANT A | WEB EVENT LOG OF SERVICE 1 | ap1server1 | 0:00:00 4/1/2011 | 0:00:00 5/1/2011 | 3 MILLION DATA | abcdef (OMITTED) | 1.5GB | 150MB | T250 |
| TENANT A | WEB EVENT LOG OF SERVICE 1 | ap1server1 | 0:00:00 5/1/2011 | 0:00:00 6/1/2011 | 3 MILLION DATA | ghijkl (OMITTED) | 1.4GB | 140MB | T251 |

| TENANT T301 | DATA TYPE NAME T302 | INSTANCE NAME T303 | TARGET DATA T304 | INDEX INTERNAL DATA T305 | INDEX BYTE COUNT T306 | INDEX DATA COUNT T307 |
|---|---|---|---|---|---|---|
| TENANT A | WEB EVENT LOG OF SERVICE 1 | ap1server1 | LOG MEASUREMENT TIME DATA TYPE NAME INSTANCE NAME | (OMITTED) | 3.6GB | 6 MILLION DATA — T350 |
| TENANT A | WEB EVENT LOG OF SERVICE 1 | ap1server1 | LOG MEASUREMENT TIME DATA TYPE NAME INSTANCE NAME EVENT NAME | (OMITTED) | 2.4GB | 3 MILLION DATA — T351 |
| TENANT A | WEB EVENT LOG OF SERVICE 1 | ap1server1 | LOG MEASUREMENT TIME DATA TYPE NAME INSTANCE NAME EVENT NAME CLIENT NAME | (OMITTED) | 1GB | 1 MILLION DATA — T352 |

| | T501 | T502 | T503 | T504 | T505 | T506 | T507 | T508 | T509 | T510 | |
|---|---|---|---|---|---|---|---|---|---|---|---|
| ACCESS TIME | TENANT | OPERATIONS MANAGER | MINIMUM VALUE OF SEARCHED LOG MEASUREMENT TIME | MAXIMUM VALUE OF SEARCHED LOG MEASUREMENT TIME | SEARCH CONDITIONS OTHER THAN TIME | RESPONSE TIME REQUIRED FOR SEARCH | COUNT HIT IN SEARCH | INDEX UTILIZED FOR SEARCH | ACCESS TO COMPRESSED DATA | |
| 09:00:00 03/30/2012 | TENANT A | OPERATIONS MANAGER 1 | 00:00:00 03/30/2012 | 00:00:00 03/31/2012 | DATA TYPE NAME="WEB EVENT LOG OF SERVICE 1" INSTANCE NAME="ap1server1" | 2 SECONDS | 2,000 DATA | LOG MEASUREMENT TIME DATA TYPE NAME INSTANCE NAME | NOT-EXISTENCE | T550 |
| 09:01:00 03/30/2012 | TENANT A | OPERATIONS MANAGER 1 | 00:00:00 03/29/2012 | 09:00:00 03/30/2012 | DATA TYPE NAME="WEB EVENT LOG OF SERVICE 1" INSTANCE NAME="ap1server1" | 9 SECONDS | 10,000 DATA | LOG MEASUREMENT TIME DATA TYPE NAME INSTANCE NAME | NOT-EXISTENCE | T551 |
| 09:03:00 03/30/2012 | TENANT A | OPERATIONS MANAGER 1 | 00:00:00 03/29/2012 | 09:00:00 03/30/2012 | DATA TYPE NAME="WEB EVENT LOG OF SERVICE 1" INSTANCE NAME="ap1server1" EVENT NAME="Action1" | 2 SECONDS | 500 DATA | LOG MEASUREMENT TIME DATA TYPE NAME INSTANCE NAME EVENT NAME | NOT-EXISTENCE | T552 |
| 09:04:00 03/30/2012 | TENANT A | OPERATIONS MANAGER 1 | 00:00:00 03/29/2012 | 09:00:00 03/30/2012 | DATA TYPE NAME="WEB EVENT LOG OF SERVICE 1" INSTANCE NAME="ap1server1" REQUEST PROCESSING TIME>2000 | 8 SECONDS | 100 DATA | LOG MEASUREMENT TIME DATA TYPE NAME INSTANCE NAME | NOT-EXISTENCE | T553 |
| 09:05:00 03/30/2012 | TENANT A | OPERATIONS MANAGER 1 | 00:00:00 05/02/2012 | 09:00:00 05/02/2012 | DATA TYPE NAME="WEB EVENT LOG OF SERVICE 1" INSTANCE NAME="ap1server1" | 30 SECONDS | 1,000 DATA | UNUSED | EXISTENCE | T554 |

| CONFIGURATION ID (T701) | TENANT (T702) | DATA TYPE NAME (T703) | INSTANCE NAME (T704) | DATA CONSERVATION FORMAT (T705) | DATA CONSERVATION AMOUNT (T706) | RETENTION (T707) | |
|---|---|---|---|---|---|---|---|
| 1 | TENANT A | WEB EVENT LOG OF SERVICE 1 | ap1server1 | RAW DATA | 9GB | 1,800 MILLION DATA | T750 |
| 2 | TENANT A | WEB EVENT LOG OF SERVICE 1 | ap1server1 | COMPRESSED DATA | 0.9GB | 1,800 MILLION DATA | T751 |
| 3 | TENANT A | WEB EVENT LOG OF SERVICE 1 | ap1server1 | INDEX | 3.6GB | 600 MILLION DATA | T752 |
| 4 | TENANT A | WEB EVENT LOG OF SERVICE 1 | ap1server1 | INDEX | 2.4GB | 300 MILLION DATA | T753 |

| INDIVIDUAL POLICY ID (T901) | TENANT (T902) | METRICS M1 (TIME REQUIRED FOR THE CONFIGURATION CHANGES) (T903) | METRICS M2 (CHANGE OF PERFORMANCE WITH THE CONFIGURATION CHANGES) (T904) | METRICS M3 (CHANGE OF DATA AMOUNT WITH THE CONFIGURATION CHANGES) (T905) | |
|---|---|---|---|---|---|
| 1 | TENANT A | LESS THAN 60 MINUTES IN TIME REQUIRED FOR THE THE CONFIGURATION CHANGES | 1 SECOND OR MORE IN A DECREASE OF CRITERIAL RESPONSE TIME WITH THE CONFIGURATION CHANGES | UNLIMITED | T950 |
| 2 | TENANT A | LESS THAN 60 MINUTES IN TIME REQUIRED FOR THE CONFIGURATION CHANGES | LESS THAN 1 SECOND IN AN INCREASE OF CRITERIAL RESPONSE TIME WITH THE CONFIGURATION CHANGES | 1 GB or MORE IN REDUCTION OF CRITERIAL DATA CONSERVATION AMOUNT WITH THE CONFIGURATION CHANGES | T951 |

| ENTIRE POLICY ID | TENANT | METRICS M4 (TIME REQUIRED FOR THE CONFIGURATION CHANGES) | METRICS M5 (CHANGE OF PERFORMANCE WITH THE CONFIGURATION CHANGES) | METRICS M6 (CHANGE OF DATA AMOUNT WITH THE CONFIGURATION CHANGES) |
|---|---|---|---|---|
| 1 | TENANT A | LESS THAN 300 MINUTES IN A TOTAL OF TIME REQUIRED FOR ALL CONFIGURATION CHANGES | LESS THAN 10 SECONDS IN AN AVERAGE OF CRITERIAL RESPONSE TIME FOR ALL CONFIGURATION AFTER THE CHANGE | LESS THAN 100 GB IN A DATA CONSERVATION AMOUNT OF ALL LOG DATA AFTER CHANGE |
| 2 | TENANT B | LESS THAN 300 MINUTES IN A TOTAL OF TIME REQUIRED FOR ALL CONFIGURATION CHANGES | LESS THAN 5 SECONDS IN AN AVERAGE OF CRITERIAL RESPONSE TIME FOR ALL CONFIGURATION AFTER CHANGE | LESS THAN 50 GB IN A DATA CONSERVATION AMOUNT OF ALL LOG DATA AFTER CHANGE |

FIG.14

| CONFIGURATION ID | TENANT | DATA TYPE NAME | INSTANCE NAME | DATA CONSERVATION FORMAT | INDEX TARGET DATA | RETENTION |
|---|---|---|---|---|---|---|
| 1 | TENANT A | WEB EVENT LOG OF SERVICE 1 | ap1server1 | RAW DATA | - | [FROM 200 DAYS BEFORE TO CURRENT] |
| 2 | TENANT A | WEB EVENT LOG OF SERVICE 1 | ap1server1 | COMPRESSED DATA | - | [FROM 360 DAYS BEFORE TO 200 DAYS BEFORE] |
| 3 | TENANT A | WEB EVENT LOG OF SERVICE 1 | ap1server1 | INDEX | LOG MEASUREMENT TIME DATA TYPE NAME INSTANCE NAME | [FROM 90 DAYS BEFORE TO CURRENT] |
| 4 | TENANT A | WEB EVENT LOG OF SERVICE 1 | ap1server1 | INDEX | LOG MEASUREMENT TIME DATA TYPE NAME INSTANCE NAME EVENT NAME | [FROM 30 DAYS BEFORE TO CURRENT] |
| 6 | TENANT A | WEB EVENT LOG OF SERVICE 1 | ap1server1 | INDEX | LOG MEASUREMENT TIME DATA TYPE NAME INSTANCE NAME REQUEST PROCESSING TIME | [FROM 30 DAYS BEFORE TO CURRENT] |

FIG. 16

| CONFIGURATION ID | TENANT | DATA TYPE NAME | INSTANCE NAME | DATA CONSERVATION FORMAT | (CURRENT) CONFIGURATION INFORMATION BEFORE CHANGE | | (CURRENT) CONFIGURATION INFORMATION AFTER CHANGE | | CATEGORY | METRICS M1 (PROCESSING TIME REQUIRED FOR CONFIGURATION CHANGES) | METRICS M2 (CHANGE OF PERFORMANCE WITH THE CONFIGURATION CHANGES) | METRICS M3 (CHANGE OF DATA VOLUME WITH THE CONFIGURATION CHANGES) | |
|---|---|---|---|---|---|---|---|---|---|---|---|---|---|
| | | | | | INDEX TARGET DATA | RETENTION | INDEX TARGET DATA | RETENTION | | | | | |
| 1 | TENANT A | Web EVENT LOG OF SERVICE 1 | ap1server1 | RAW DATA | - | [FROM 180 DAYS BEFORE TO CURRENT] | - | [FROM 200 DAYS BEFORE TO CURRENT] | CHANGE | 30 MINUTES | NO CHANGE | 1 GB INCREASE | T1150 |
| 2 | TENANT A | Web EVENT LOG OF SERVICE 1 | ap1server1 | RAW DATA | - | [FROM 360 DAYS BEFORE TO 180 DAYS BEFORE] | - | [FROM 360 DAYS BEFORE TO 200 DAYS BEFORE] | CHANGE | 10 MINUTES | NO CHANGE | 0.1 GB INCREASE | T1151 |
| 3 | TENANT A | Web EVENT LOG OF SERVICE 1 | ap1server1 | INDEX | LOG MEASUREMENT TIME, DATA TYPE NAME, INSTANCE NAME | [FROM 60 DAYS BEFORE TO CURRENT] | LOG MEASUREMENT TIME, DATA TYPE NAME, INSTANCE NAME | [FROM 90 DAYS BEFORE TO CURRENT] | CHANGE | 50 MINUTES | 1.2 SECOND DECREASE ON AVERAGE | 1.8 GB INCREASE | T1152 |
| 5 | TENANT A | Web EVENT LOG OF SERVICE 1 | ap1server1 | INDEX | LOG MEASUREMENT TIME, DATA TYPE NAME, INSTANCE NAME, EVENT NAME, CLIENT NAME | [FROM 10 DAYS BEFORE TO CURRENT] | - | - | DELETION | 30 MINUTES | 0.5 SECOND DECREASE ON AVERAGE | 2.4 GB INCREASE | T1153 |
| 6 | TENANT A | Web EVENT LOG OF SERVICE 1 | ap1server1 | INDEX | - | - | LOG MEASUREMENT TIME, DATA TYPE NAME, INSTANCE NAME, REQUEST PROCESSING TIME | [FROM 30 DAYS BEFORE TO CURRENT] | ADDITION | 30 MINUTES | 2 SECOND DECREASE ON AVERAGE | 2.4 GB INCREASE | T1154 |

FIG.19

| TENANT<br>T1301 | METRICS M4<br>(TIME REQUIRED FOR<br>CONFIGURATION CHANGES)<br>T1302 | METRICS M5 (METRICS OF<br>PERFORMANCE WITH<br>CONFIGURATION CHANGES)<br>T1303 | METRICS M6 (METRICS OF DATA<br>AMOUNT WITH CONFIGURATION<br>CHANGES)<br>T1304 |
|---|---|---|---|
| TENANT A | 210 MINUTES IN A TOTAL OF TIME REQUIRED FOR ALL CONFIGURATION CHANGES | 8 SECONDS ON AVERAGE IN CRITERIAL RESPONCE TIME FOR ALL CONFIGURATION AFTER CHANGE | 90 GB IN A DATA CONSERVATION AMOUNT OF ALL LOG DATA AFTER CHANGE |

| TENANT | SERVICE NAME | LIST OF DATA TYPE NAMES FOR SERVICE MONITORING | LIST OF INSTANCE NAMES FOR SERVICE PROVISION | ROLE | IMPORTANCE DEGREE |
|---|---|---|---|---|---|
| TENANT A | SERVICE 1 | WEB EVENT LOG OF SERVICE 1 CPU UTILIZATION RATE OF OS ... (OMITTED) | ap 1 server 1, ap 1 server 2, ap 1 ab 1, ...(OMITTED) | Web SERVICE PRODUCTION | 1 |
| TENANT A | SERVICE 1 DEMONSTRATION | WEB EVENT LOG OF SERVICE 1 ... (OMITTED) | ap 1 demo 1, ...(OMITTED) | TRIAL ENVIRONMENT | 0.5 |
| TENANT A | SERVICE 2 TEST | WEB EVENT LOG OF SERVICE 2 ... (OMITTED) | ap 2 test 1, ...(OMITTED) | TEST ENVIRONMENT | 0 |

| TENANT | SERVICE NAME | FAULT OCCURED TIME | DATA TYPE NAME USED FOR ROOT CAUSE ANALYSIS | CAUSE INSTANCE NAME |
|---|---|---|---|---|
| TENANT A | SERVICE 1 | 2012/3/15 13:00:00 | Web EVENT LOG OF SERVICE 1 | ap 1 server 1 |
| TENANT A | SERVICE 1 DEMONSTRATION | 2012/3/20 6:00:00 | CPU UTILIZATION RATE OF OS | ap 1 demo 1 |
| TENANT A | SERVICE 1 | 2012/3/22 9:00:00 | Web EVENT LOG OF SERVICE 1 | ap 1 server 1 |

T1601, T1602, T1603, T1604, T1605, T1600

TIME-SERIES DATABASE SETUP AUTOMATIC GENERATION METHOD, SETUP AUTOMATIC GENERATION SYSTEM AND MONITORING SERVER

CLAIM OF PRIORITY

The present application claims priority from Japanese application serial no. JP2012-258119, filed on Nov. 27, 2012, the content of which is hereby incorporated by reference into this application.

FIELD OF THE INVENTION

The present invention relates to a time-series database configuration automatic generation method, a generation system thereof and a monitoring server, particularly, to a technology for assisting operational management work to an operations manager of the time-series database.

BACKGROUND ART

An operations manager of a computer system monitors a fault that influences a service operated on the system, and abnormality pre-indicating a portent thereof. Further, when the fault or the abnormality is detected, the operations manager analyzes causes thereof, and takes measures when necessary.

Software for assisting such a service management work includes monitoring software. The monitoring software includes software for assisting fault detection and a cause analysis. First of all, the monitoring software has a function for communicating with hardware or software of a monitoring target, and collecting log data showing a system operation situation. The log data includes numeric data such as a CPU utilization rate, or character string data such as a text message presenting an application state. In recent years, monitoring software for collecting a variety of the log data to allow search is also present. Second of all, the monitoring software has a function for processing the log data into the form of a line graph or the like, and displaying the processed form on a screen of an operations manager terminal.

A monitoring mechanism has been so far constructed for every log data or every service. However, in connection with an influence of system integration by recent virtualization technology, an integrated monitoring mechanism for unitarily managing a plurality of services has been required.

One embodiment of monitoring software that achieves such integrated monitoring includes a monitoring platform. In the monitoring platform, a function is provided for putting different kinds of log data of different services into one place and managing the log data. In the monitoring platform, upon request from the operations manager, the Log data stored on a log database are searched, and the results are presented to the operations manager.

In the log database, capability of storing different formats of data is required depending on kinds of services or log data. Technology for flexibly storing such data exists. Patent document 1 (JP-A-2011-134342) discloses a method for, targeting a database preliminarily needing a definition of a schema (stored data structure), such as a relational database (hereinafter, RDB), storing schema data variable to a defined fixed schema. In the technology, first, a plurality of data field columns for variable data are preliminarily prepared upon defining the fixed schema. Then, definition information in different data formats for every data type is managed outside the schema, thereby allowing storage of values in different data formats to an identical field column. As a method different from the method in Patent document 1, a method also exists for storing in a hash table a key and a value of data in different formats to store a binary of table data thereof in a single column of a relational database. Furthermore, a new database provided with schema flexibility as referred to as a document-oriented database has recently appeared. The document-oriented database provides a basic function almost similar to the function of RDB, such as storage, search and indexing. However, in the document-oriented database, data are not stored in a tabular format as in the RDB, but are stored in a combination of a key and a value. Therefore, a preliminary schema definition becomes unnecessary. In the document-oriented database, the method for storing the key and the value, as is different from the art disclosed in Patent document 1 for preliminarily defining what data to be entered into what column, has an advantage of capability of corresponding also to a case where a data column definition or sequence is changed later.

Meanwhile, as technology for reducing human resources in configuration, a method exists for automating a general database configuration. Patent document 2(JP-A-2003-228570) and Patent document 3(JP-A-H6-215037) disclose arts for evaluating a database search index from search frequency to an attribute to perform automatic adjustment. Patent document 4(JP-A-H7-85093) discloses an art for evaluating frequency of utilization frequency of a preregistered index candidate from search frequency to sequentially select an index from a superordinate. Patent document 5(JP-A-H10-111819) discloses an art for automatically generating an index in which a cumulative value of search response time and insertion response time is minimized.

SUMMARY OF THE INVENTION

In order to utilize a log database of a monitoring platform, configuration of the log database is required to be performed. The configuration includes a period configuration as to "what log data are to be stored for how long of a period." Moreover, when log data search is desirably performed at a high speed, configuration of data structure including an index for speeding up is required to be performed. An operations manager by oneself is required to determine the configuration of the log databases.

However, determination or adjustment of the configuration of the log database has been complicated and laborious according to a conventional system. The reason is that the period needing storage is different depending on kinds of services or log data. Moreover, the reason is that search conditions utilized during monitoring and response performance required therefor are different for every kind of log data. Furthermore, quantitative understanding of an effect and an influence due to configuration changes has been quite difficult, and therefore confirmation has been difficult as to whether or not the configuration as requested by the operations manager is made.

Therefore, a resource such as storage has been so far excessively consumed in the log database in order to secure performance while leaving data during a sufficient period. Alternatively, excessive data deletion or performance shortage has been caused. In order to prevent such an issue as much as possible, an expert who has monitoring know-how has distinguished and examined the configuration, human resources have been consumed. As a result, management of the log database has been cost.

Even if the methods described in Patent documents 1 to 5 are applied to the log database of the monitoring platform, generation of a suitable configuration is difficult. As a premise of the reason, the log database has a feature of the conventional database, and also a feature for sequentially accumulating data provided with time-series information to perform search such data. The feature occasionally causes an inconvenience in the background art. For example, in Patent documents 1 to 5, a data utilization period being one of characteristic information of the log database is not taken into consideration. If a log data storage configuration or an index configuration is automatically generated without using the data utilization period, indexing is performed for all stored period. However, the log data or the index is actually utilized only by a specific period. Thus, the resource is excessively consumed by unnecessary index data outside the period. Thus, even if the configuration is automatically generated using a publicly known art, reexamination has been required for the configuration in consideration of the utilization period using human resources. Moreover, the publicly known examples are insufficient in a function for the operations manager to confirm the effect and the influence of the configuration to assist selection. Therefore, reduction has been quite difficult for human resources taken in configuration selection work.

One of the problems to be solved according to the present invention is to provide a log database configuration automatic generation method for automatically generating configuration changes proposal in consideration of the data utilization period being one of characteristic information on the time-series database in the monitoring platform, and presenting the configuration changes proposal to the operations manager, thereby allowing assisting of configuration changes work by the operations manager, and reduction of cost required for log monitoring by the operations manager, and the configuration automatic generation system, and the monitoring server.

Assisting of configuration changes work applying the present invention allows automatic generation of configuration changes proposal in consideration of a data utilization period for every monitoring target to automatic generate configuration information changes proposal, and therefore allows reduction of waste of a resource of a time-series database of a monitoring platform, and reduction of cost required for monitoring by an operations manager.

BRIEF DESCRIPTION OF THE DRAWINGS

FIG. 3 is a drawing showing an example of log raw data in a first embodiment.

FIG. 4 is a diagram showing an example of log compressed data.

FIG. 5 is a diagram showing an example of log index data.

FIG. 7 is a drawing showing an example of an operation history.

FIG. 9 is a drawing showing an example of data volume information.

FIG. 10 is a diagram showing an example of individual policy information.

FIG. 11 is a diagram showing an example of entire policy information.

FIG. 14 is a diagram showing an example of configuration information after change in a first embodiment.

FIG. 16 is a diagram showing an example of difference information of configuration changes.

FIG. 19 is a diagram showing an example of a configuration changes entire metrics value.

FIG. 26 is a diagram showing an example of service information.

FIG. 27 is a diagram showing an example of fault information.

MODES FOR CARRYING OUT THE INVENTION

First, an outline of a time-series database configuration automatic generation system according to the present invention is described.

The configuration automatic generation system according to the present invention is achieved by a computer system as described in embodiments below. Physical or virtual equipment on the computer system is to be lent to a plurality of enterprises or organizations. In the present invention, aggregation of equipment lent to each enterprise is referred to as "tenant." In the present invention, monitoring of a service is performed for every tenant. The equipment on the computer system in the present invention is shared among tenants. However, an operations manager of a certain tenant is not allowed to browse information of any other tenant to be stored on the equipment. The reason is that log data for monitoring the service may include a trade secret of each enterprise.

Figure 1:
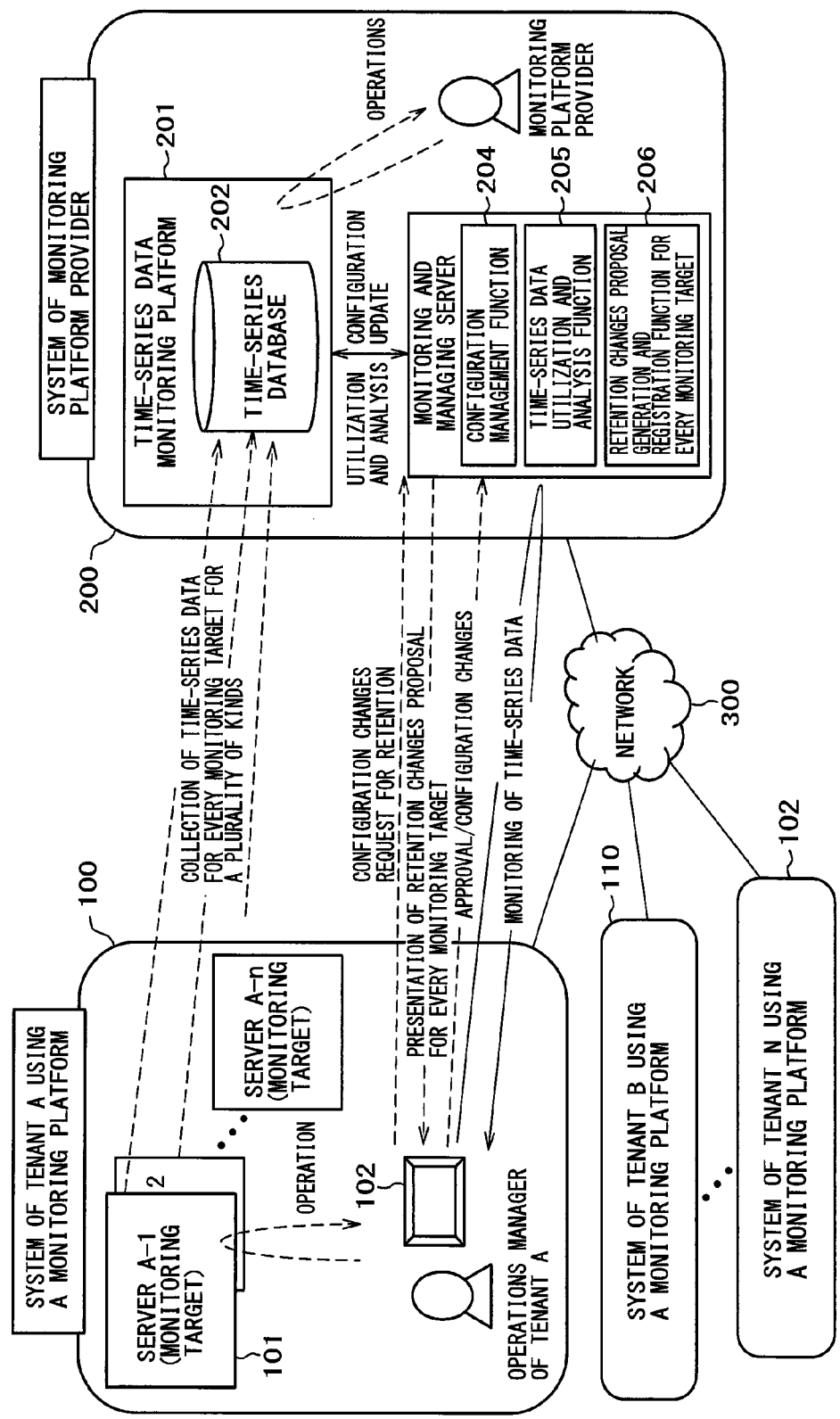
FIG. 1 is a drawing showing an example of a monitoring platform to which a log database according to the present invention is applied.

FIG. 1 is a drawing showing an example of a monitoring platform to which a time-series database configuration automatic generation system related to the present invention is applied. In the monitoring platform, a function is provided for putting different kinds of log data of different services into one place and managing the log data. Moreover, the monitoring platform shown in FIG. 1 is formed as a multi-tenant type monitoring platform. The multi-tenant type monitoring platform refers to a form in which a monitoring platform provider provides the monitoring platform with a business operator or business operators (hereinafter, tenant) as a service (Software as a Service).

Here, an outline of the functional of the monitoring platform is described using FIG. 1. Monitoring platform 201 held by system 200 of a monitoring platform provider is connected through network 300 to each of systems 100, 110 and 120 of a plurality of tenants (A), (B) and (N) using the monitoring platform. Attention is paid to system 100 of tenant A herein. Tenant A provides a service to each end user in tenant A by server 101 (A-1 to A-n) on the system 100. Monitoring platform 201 of system 200 of the monitoring platform provider is provided with time-series database 202 and monitoring server 203. An operations manager of tenant A is accessible through terminal 102 to server 101 of a monitoring target and system 200 of the monitoring platform provider. In order to monitor an operation situation of each service to be provided for the end user in tenant A, system 200 of the monitoring platform provider sequentially collects time-series data such as various kinds of log data output or measured on each server 101 (A-1 to A-n) on monitoring platform 201 to store the data in time-series database 202. In the present invention, such a database for storing the time-series data is referred to as a time-series database. Monitoring server 203 of system 200 of the monitoring platform provider has configuration management function 204 for time information of time-series data or the like, time-series data utilization and analysis function 205, and changes proposal generation and registration function 206 for the time information or the like for every monitoring target, and is provided with a database for management and configuration in which various kinds of information for management and configuration are held (see FIG. 2).

Time-series data utilization and analysis function 205 searches time-series data upon request of monitoring by the operations manager, and outputs results thereof to terminal 102 of the operations manager. Changes proposal generation and registration function 206 searches, utilizes and analyzes, based on information on the database for management and configuration, the time-series data stored in time-series database 202, and generates, upon request of change regarding the time-series data from an operations manager of tenant A, or from a monitoring platform side itself, time-series data changes proposal including time information (for example, a retention), for example, once a month, presents results thereof to terminal 102 of the operations manager, and if approval is obtained, changes the time information of the time-series data.

In addition, according the present invention, the combination (tenant, data type, instance name) forming a unit for generating configuration changes proposal is defined as "monitoring target."

Thus, the monitoring platform provider (operations manager) allows suitable updating of configuration information regarding conservation of time-series data for every monitoring target with meeting a requirement of the operations manager of the tenant. Such updating allows reduction of cost required for log monitoring (in particular, management of the time-series database) by the operations manager of the monitoring platform. More specifically, according to the present invention, configuration changes proposal in consideration of a data utilization period are automatically generated for every monitoring target. Metrics information to be served as a judgment source of an effect and an influence by the configuration changes proposal is presented. Such presentation allows reduction of a man-hour of log database configuration examination work. Second, in the present invention, configuration changes proposal are generated by analysis a kind and a period of log data actually utilized from the operation history. Configuration changes of time-series data conservation format is performed according to the proposal, thereby allowing reduction of unnecessary data on the log database. Moreover, intensified log monitoring of the monitoring platform by the operations manager is allowed. According to the present invention, the configuration changes proposal in conformity with utilization are generated for every monitoring target. Therefore, suppression is allowed for loss caused by excessive log data deletion (fault correspondence man-hour increase, opportunity loss) that has been so far generated.

In addition, in an embodiment according to the present invention as described below, the log database is illustrated as the time-series database of the monitoring platform. However, the embodiment according to the present invention is not limited to the log database. The present invention can be applied if the time-series database is accumulated in the order of time series. For example, the present invention may be applied to time-series database for accumulating a communication (telephone call) history (time-series data) in a telecommunications sector. The communication history in which an enormous amount of data is stored for every user is searched, for example, for improving service quality. Therefore, the communication history is similar, in the utilization, to the log database presented in the embodiment according to the present invention, and therefore, can be managed by the method of the embodiment according to the present invention. Moreover, the present invention can be applied to Web blog update information, contributed information in an asynchronous short sentence contribution service, a time-series database for marketing in which time-series data such as a buying history using an IC card is stored.

Hereinafter, a detailed embodiment according to the present invention is described with referring to drawings.

[Embodiment 1]

A first embodiment of the present invention refers to an example in which log database configuration changes proposal are automatically generated on occasion of request from an operations manager to present the configuration changes proposal to the operations manager.

Figure 2:
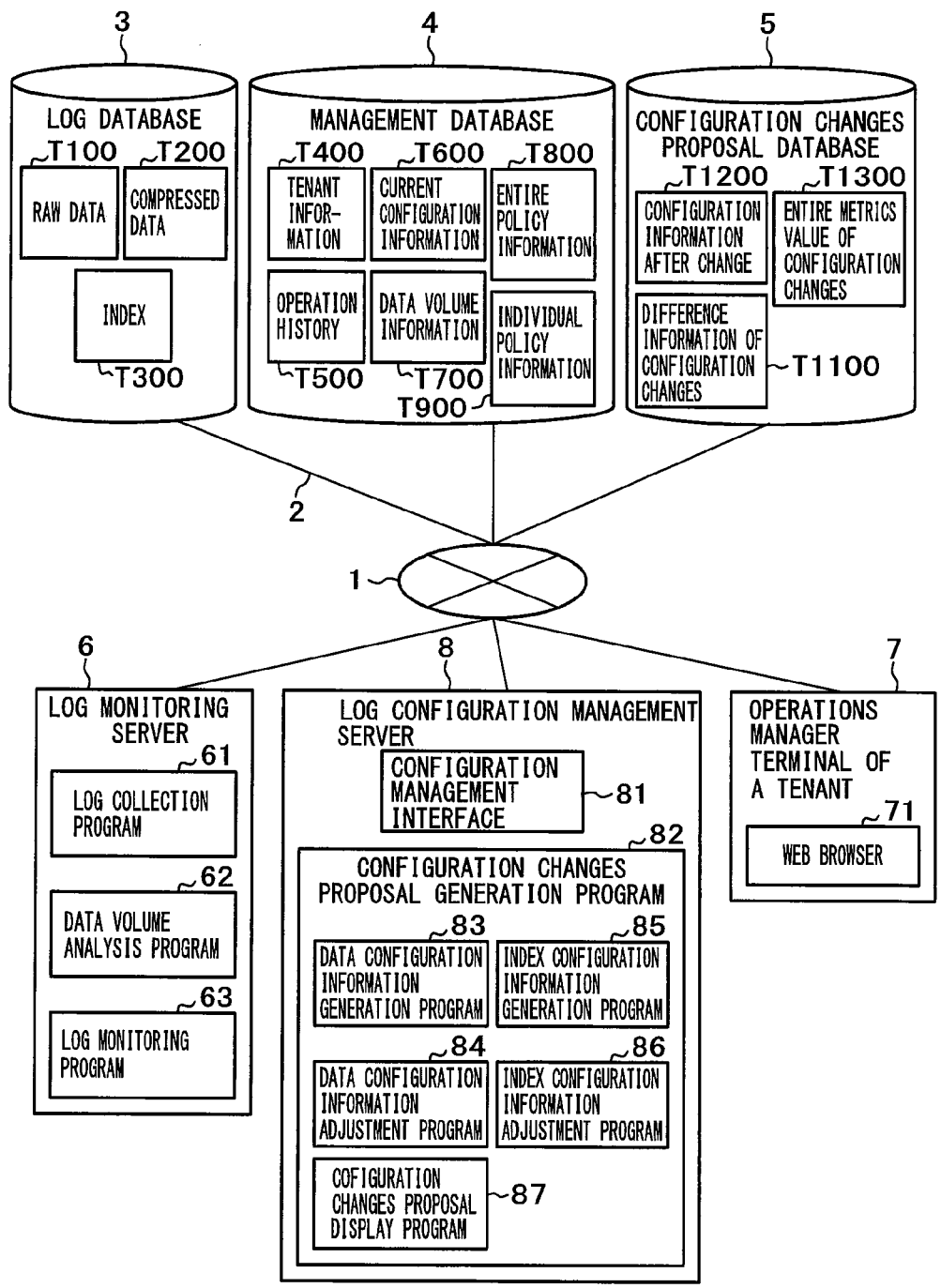
FIG. 2 is a drawing schematically showing a log database configuration automatic generation system related to a first embodiment according to the present invention.

In FIG. 2, a log database configuration automatic generation system related to the first embodiment of the present invention is schematically shown. FIG. 2 schematically shows a computer system for achieving the first embodiment.

The computer system is constituted of log database 3, management database 4, configuration changes proposal database 5, log monitoring server 6, log configuration management server 8, and operations manager terminal 7 of a tenant. The relevant equipment is connected through physical communication line 2 to management network 1.

Log database 3 is used for the operations manager to manage equipment log data to provide a service. In log database 3 in the present embodiment, log data are managed in a predetermined conservation format for every tenant, every kind of log data and every equipment. Moreover, the log database 3 is to be operated through operations manager terminal 7 by a plurality of operations managers of each tenant. The manager terminal 7 may exist as many as the number of operations managers.

Management database 4 stores information for managing log database 3, and is utilized by each server and each unit (program) as described later. Management database 4 holds management information regarding log databases 3, such as tenant information T400, current configuration information T600 of log database 3, and data volume information T700 of log database 3, and a history regarding log database 3, such as operation history T500 to log database 3.

Log monitoring server 6 holds, in a memory thereof, log collection program 61 for allowing a server (computer) to function as "log data collection and storage unit," log monitoring program 63 for allowing the server (computer) to function as "stored log monitoring unit" and data volume analysis program 62 for allowing the server (computer) to function as "data volume analysis unit."

"Log data collection and storage unit" (log collection program) 61 has a function for collecting log data from equipment for service provision. As a general collection method, the log data are collected by operating an agent such as Simple Network Management Protocol (SNMP) on each of equipment, and allowing communication between the agent and "log data collection and storage unit" 61. "Log data collection and storage unit" 61 sequentially registers received log data into log database 3.

"Stored log monitoring unit" (log monitoring program) 63 provides a function for searching log data upon request of monitoring by the operations manager to display results thereof. For example, if "stored log monitoring unit" 63 receives a monitoring request from web browser 71 displayed on a screen of operations manager terminal 7, extracts log data from log database 3 according to a log-data search conditions included in the monitoring request. Then, the thus extracted log data are analyzed and processed according to the monitoring request to display results thereof on web browser 71. Moreover, "stored log monitoring unit" 63 has a function for recording through the unit a history of performing a log data monitoring operation on management database 4. Hereinafter, the history is referred to simply as "operation history."

"Data volume analysis unit" (data volume analysis program) 62 has a function for analysis log data registered into log database 3 to analyze a stored data volume (hereinafter, referred to as data conservation amount). An analytical method therefor is described later.

Log configuration management server 8 provides a function for the operations manager to manage configuration of log database 3. Log configuration management server 8 holds, in a memory thereof, configuration management interface 81 and configuration changes proposal generation program 82. Configuration changes proposal generation program 82 is a program for allowing the server (computer) to function as "configuration changes proposal generating unit," and is constituted of five subprograms including data configuration information generation program 83 for allowing the server to function as "data configuration information generating unit," data configuration information adjustment program 84 for allowing the server to function as "data configuration information adjusting unit," index configuration information generation program 85 for allowing the server to function as "index configuration information generating unit," index configuration information adjustment program 86 for allowing the server to function as "index configuration information adjusting unit" and configuration changes proposal display program 87 for allowing the server to function as "configuration changes proposal displaying unit." In addition a category of each unit (each subprogram) is only one example, and some of the units (subprograms) may be obviously unified to one, or any one of the unit (subprogram) may be obviously categorized and constituted according to each function.

Configuration management interface 81 is a unit (program) for browsing or changing, upon request of monitoring from operations manager terminal 7, configuration of configuration information of log database 3 of a tenant as managed by the operations manager. During browsing the configuration information, configuration management interface 81 accesses management database 4, acquires the configuration information of log database 3 of the tenant as managed by the operations manager who places request, and displays the configuration information on a screen. The operations manager places request of configuration changes by inputting the request of addition, deletion, overwriting or the like to the configuration information displayed on the screen. Upon request of the configuration changes from the operational manager, configuration management interface 81 accesses management database 4 to update recorded configuration information. Furthermore, configuration management interface 81 accesses log database 3 to reflect a new configuration.

"Configuration changes proposal generating unit" 82 uses the information stored in management database 4 to analyze a utilization situation of log database 3 of the tenant to automatically generate configuration changes proposal in conformity with the situation. "Configuration changes proposal generating unit" 82 is invoked on occasion of request through configuration management interface 81 from the operations manager to generate the configuration changes proposal and display the changes proposal on a screen.

In the present embodiment, a means is provided for automatically generating the configuration changes proposal of the log database from the operation history of log monitoring unit 62, the data volume information of log database 3, the current configuration information or the like. In addition to the conventional log database, a management database is prepared in which the history information of the operation to the log monitoring unit, the data volume information of the log database and the current configuration information are stored. If the operations manager of the tenant performs through the log monitoring unit an operation of log database monitoring, the log monitoring unit records a history of the operation on management database 4. Moreover, if the operations manager performs through configuration management interface 81 configuration changes of the log database, the configuration management interface records the configuration information on the management database. Furthermore, if log data of a monitoring target device are collected on a log database through log acquiring unit 61, log data volume analysis unit 62 reads utilization information of the data volume of the log database, and records the information on the management database.

Configuration changes proposal generating unit 82 automatically generates log database configuration changes proposal based on the information recorded on the management database. In order to perform the automatic generation, the unit 82 utilizes information such as the operation history, the information on a log utilization period and a data conservation format included in the current configuration information. Moreover, in order to present an effect and influence of the automatically generated changes proposal to the operations manager, the unit 82 calculates a metrics value for evaluating time required for configuration changes, a metrics value for evaluating performance in connection with the configuration changes, and a metrics value for evaluating the data volume in connection with the configuration changes to presents the information to the operations manager.

Generation processing of the configuration changes proposal by the function of each of units 83 to 87 (program) is described later in detail.

Hereinafter, the log data stored in log database 3 in the present embodiment are described in detail.

Log database 3 in the present embodiment stores log data for every tenant. In FIG. 2, an example is shown in which log data of a plurality of tenants are managed on one log database 3.

Moreover, log database 3 in the present embodiment stores log data in a tabular format. However, the embodiment according to the present invention is not limited to data in the tabular format. If data corresponding to each of information as described later, for example, tree structure data or text data exist, the present invention can be applied thereto.

An example of the log data stored in log database 3 in the present embodiment includes three kinds of data conservation formats, including raw data T100, compressed data T200 and index T300. Raw data T100 are log data per se collected from the equipment for service provision. Moreover, compressed data T200 and index T300 include information generated by analysis and processing the raw data T100.

In the present embodiment, the information on the tenant, the kind of log data, and the equipment for service provision is provided for the log data.

Subsequently, a name for uniquely identifying the kind of log data is referred to as "data type name." The data type includes data regarding an OS, data regarding middleware (database, Web container or the like) commonly used from a plurality of applications on the OS, and data inherent to the application. The data type name includes "Web event log of service 1," "CPU utilization rate of OS" or the like, which is character string data by which the types can be specified.

Moreover, a name for uniquely identifying the equipment for service provision is referred to as "instance name." The instance name might include a host name or an IP address.

In log database 3 in the present embodiment, a configuration of each conservation format is determined in a unit of the tenant, the data type name and the instance name. Hereinafter, a set of the tenant, the data type name and the instance name is referred to as a monitoring target. Data to be stored in raw data T100, compressed data T200 and index T300 are associated with each other by the monitoring target. In the present embodiment, the tenant, the data type name and the instance name are used as the monitoring target, but is only an example, and information different therefrom may be used as the monitoring target.

FIG. 3 shows one example of raw data T100. Column T102 includes a tenant name for managing a log. Column T103 represents time when the log is output. Column T104 includes a data type name and column T105 includes an instance name. Information presented by the columns T102, T104 and T105 is monitoring target T120. In an example in the present embodiment, the information in columns T102 to T105 is essential data to be provided for all the logs without fail. Meanwhile, column T106 presents data in which the content stored is different for every data type name or instance name. Hereinafter, data in which the content stored is different for every data type name or instance name are referred to optional data. The optional data are stored as a pair of a name (key) and a value. Hereinafter, the key and the value are referred to as an optional data name and an optional data value, respectively. Thus, the data are managed by a pair of the name and the value as described above, thereby allowing storage of logs in a wide variety of formats in a table. For example, a first pair of column T106 of row T150 presents that data of a name "event name" and a value "Action1" are recorded on a log. Column T112 presents a byte count per log data. The byte count includes a total value of byte counts of various types of essential data and byte counts of optional data of the log, for example.

Here, in FIG. 3, in order to simplify an expression in the Figure, an example is shown in which raw data are stored in a tabular format. However, the data may be practically stored in a document-oriented database for storing all the data in a set of the key and the value. Even in such a case, no significant difference exists in comparison with a case where all sets of keys and values are stored in a single column in the tabular format as shown in the Figure.

FIG. 4 shows one example of compressed data T200. Compressed data T200 include data prepared by compressing raw data T100 according to a predetermined conversion procedure. Conservation capacity can be saved by compressing the data. However, when compressed data T200 are subjected to log data search, the data is required to be once decompressed and then searched, and therefore search needs further time in comparison with the raw data. Therefore, raw data T100 with low utilization frequency or raw data T100 whose search performance may be late are generally subjected to a compression target. In the example, raw data T100 included within a predetermined period are collectively compressed, and a mass of the compressed data is stored as one row (record). Columns T201 to T203 present a tenant, a data type name and an instance name. The columns correspond to columns T102 to T104 of raw data T100. Columns T204 and T205 present compression start target time and end target time, respectively. Among raw data T100 to which columns T102 to T104 correspond, data in which log measurement time is included between compression start target time and end target time serve as compression target data in the record. Column T206 presents a count of raw data subjected to the compression target. Column T207 presents actually compressed data. Generally, compressed data T200 are expressed in a binary format, and therefore are difficult to allow reading. Therefore, the description of column T207 is omitted. Column T208 and column T209 present a byte count before compression and after compression, respectively.

FIG. 5 shows one example of index T300. The index refers to data for accelerating raw data search on a table. In the present embodiment, a column index for accelerating search format least one data column in the table is to be used as one example of the index. Moreover, in target data of the index, designation is to be allowed for an essential data name and an optional data name of raw data T100. For example, when "log measurement time" being the essential data name of raw data T100 is indexed, search is allowed at a higher speed than usual on performing designation of specific time or a range of time to log search conditions. Moreover, when "event name" being the optional data name is indexed, search at a high speed is allowed on designating the event name to the log search conditions. A plurality of data columns may also be indexed. For example, in the case where "data type name, log measurement time, and an instance name" are indexed in the order, when refinement is performed in the consecutive order on search conditions, high-speed search is allowed. When refinement is performed in the order of the data type name, the log measurement time, and the instance name, in the order of the data type name and the log measurement time and only in the data type name in the index, high-speed search is allowed. Meanwhile, in the case when search is deviated from the order, when refinement is performed in the order of the instance name and the data type name, high-speed search using the index is not allowed. Moreover, when a data column that is not included in the index is added to search conditions, high-speed refinement is performed in a column included in the index, and then ordinary refinement is performed in a column that is not included therein. Columns T301 to T303 present a tenant, a data type name and an instance name. The columns correspond to columns T102 to T104 of raw data T100. Column T304 includes information presenting target data of the index. All of rows T350 to T354 are examples of providing column indices for raw data (rows T151 to T151) in which monitoring targets of log data includes (tenant A, Web event log of service 1 and ap1server1). However, target data columns are different in rows T350 to T354, respectively. Thus, a plurality of indices may be configured for one monitoring target. Column T305 is a column presenting internal data structure of the index. In column T305, the data structure of the index per se may be stored, or reference information to data structure may also be stored. For the data structure of the index in the present embodiment, use of tree structure referred to as B+tree that is adopted in many databases is presumed, and the description on detailed internal structure is omitted. Columns T306 and T307 present a byte count and a data count of the index data, respectively.

In FIG. 5, all the index data are managed in one table. However, the embodiment of the present invention is not limited to the system. For example, a separate index table may be prepared for every monitoring target.

In the present embodiment, the three data conservation formats as described above are handled. However, the embodiment according to the present invention is not limited to the data formats. For example, results of analysis a plurality of log data within predetermined time may be stored as cache.

Hereinafter, information to be stored in management database 4 in the present embodiment is described in detail.

Figure 6:
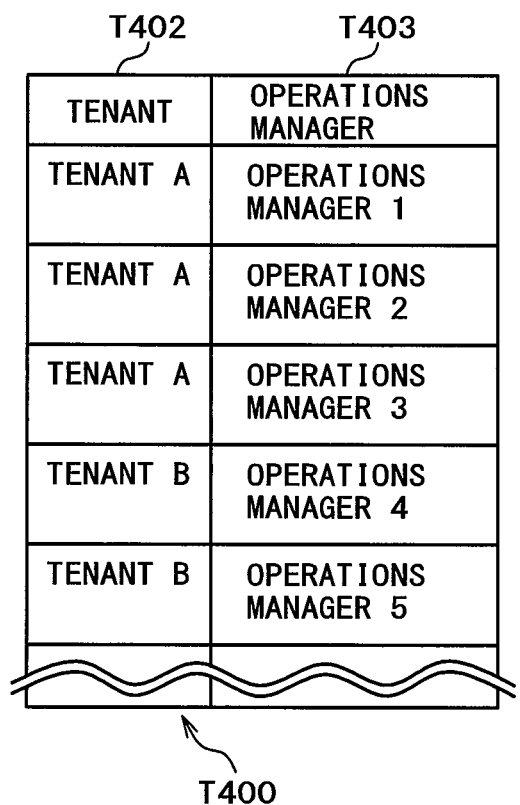
FIG. 6 is a diagram showing an example of tenant information.

FIG. 6 shows one example of tenant information T400. Tenant information T400 includes data presenting correspondence relationship between a tenant using log database 3 and an operations manager belonging to the tenant. Column T402 includes a name of the tenant to whom the operations manager belongs. Column T403 includes a name of the operations manager.

FIG. 7 is a drawing showing an example of operation history T500 relative to log monitoring unit 63. Column T501 includes time and date on which an operations manager accesses log monitoring unit 63. Column T502 includes a name of a tenant to whom the operations manager belongs. Column T503 includes a name of the operations manager who accesses log monitoring unit 63. Columns T504 to T506 include information presenting search conditions designated during browsing. Columns T504 and T505 include a range of log measurement time designated by the search conditions. Column T504 includes a minimum value of measurement time, and column T505 includes a maximum value thereof. In the present embodiment, designation of a range of measurement time of day on the search conditions is to be essential. Moreover, log data of the minimum value or more and the maximum value or less of designated measurement time are to be searched. Column T506 includes search conditions other than the log measurement time of day. For example, row T553 includes conditions when search is performed for log data, in which, within designated measurement time, a data type name agrees with "Web event log of service 1," an instance name agrees with "ap1server1," and request processing time is "2000" or more. Column T507 includes response time in a server required for search under the conditions. Column T508 includes data count hit during search under the conditions. Column T509 includes an index utilized for search under the conditions. In the column, information on a target data column of a utilized index is registered. When any index is not utilized for search, "unused" is registered. Column 510 presents whether or not any access is made to compressed data upon the search. When any access is made to compressed data, "existence" is registered, and when any access is not made thereto, "not-existence" is registered.

In the present embodiment, the search conditions as described above are taken as one example, but the present invention is not limited only to the conditions. For example, the search conditions may also include designation of sorting conditions.

Figure 8:
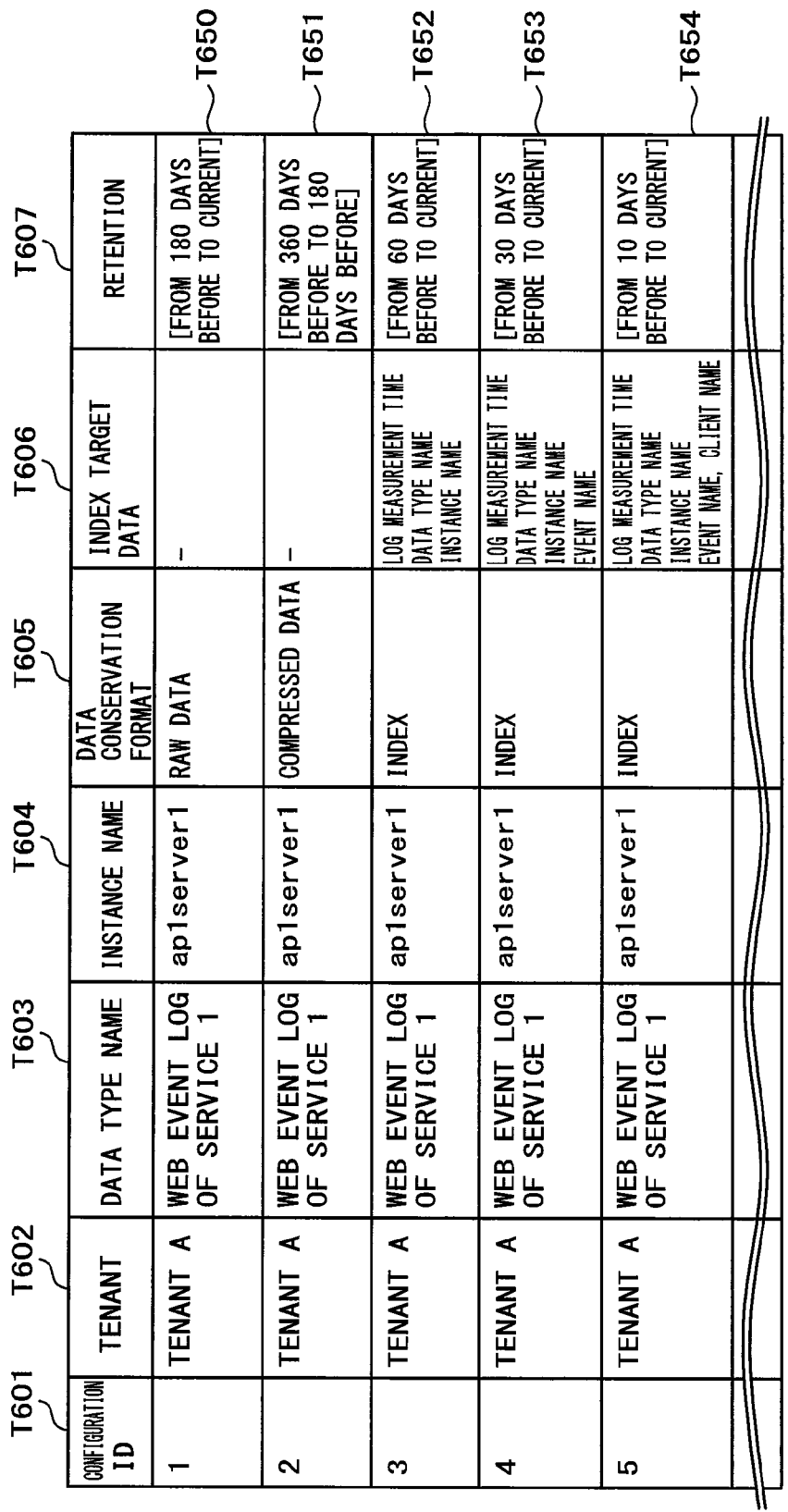
FIG. 8 is a drawing showing an example of current configuration information.

FIG. 8 is a diagram showing an example of current configuration information T600 of log database 3. In log database 3, a configuration according to the information is reflected. Column T601 includes ID for uniquely identifying a configuration of a log database. The configuration ID is to be newly automatically provided upon configuration information being added. In a processing flow to be described hereinafter, configuration information may be occasionally added, but the description is omitted for automatic provision processing of the configuration ID. Columns T602 to T604 include information presenting a monitoring target. Column T602 includes a name of a tenant managing log data to be configured.

Column T603 includes a name of a data type of log data to be configured. Column T604 includes a name of an instance for outputting log data to be configured. Column T605 presents a conservation format of data designated for the monitoring target. In the conservation format, any one of "raw data," "compressed data" or "index" is designated. Column T606 presents a target data column for which an index is provided. The column is used only when "index" is designated into data conservation format T605. Column T607 includes data retention to be configured. In the present embodiment, a range of time starting from current time is designated in the retention, such as [from 180 days before to current]. In log database 3, only log data within the range of the retention are stored, and log data out of range are sequentially deleted.

Here, a raw data configuration, a compressed data configuration and an index configuration are described using an example, respectively. Row T650 includes configuration for conserving raw data in which information presenting a monitoring target is (tenant A, Web event log of service 1, and ap1server1) from 180 before to current. Log data outdated from 180 days are, when the compressed data configuration is made, sequentially compressed, and when the configuration is not made, are sequentially deleted from on log database 3. Row T651 includes configuration for conserving compressed data of a monitoring target identical with the target of row T650 from 360 days before to 180 days before. Thus, an end time point of the retention of compressed data is configured so as to be continuous with a start time point of the retention of raw data. Rows T652 to T654 includes an index configuration to raw data having information presenting a monitoring target identical with the target of row T650.

FIG. 9 is a diagram showing an example of data volume information T700 of log database 3. In the data volume information T700, results are stored in which log data analysis unit 62 analyzes data of log database 3 to tabulate a data conservation amount and count. Column T701 includes ID for uniquely identifying a log database configuration. Columns T701 to T705 include information presenting a monitoring target and a data conservation format. The columns T701 to T705 correspond to columns T601 to T605 of configuration information T600. Column T706 includes data conservation capacity of log data of the configuration. Results obtained by tabulating the data conservation capacity stored on log database 3 are stored in the column. Here, a calculation method for the data conservation capacity is described for every data conservation format in the present embodiment. When data conservation format T705 includes "raw data," log data analysis unit 62 refers to raw data T100 on log database 3, extracts rows in which information T102, T104 or T105 presenting a monitoring target agrees with T701, T702 or T703, and counts byte count T112 thereof. When data conservation format T705 includes "compressed data," log data analysis unit 62 refers to compressed data T200 on log database 3, extracts rows in which information T201 to T203 presenting a monitoring target agrees with T701, T702 or T703, and counts byte count T209 thereof. When data conservation format T705 includes "index," log data analysis unit 62 refers to index T300 on log database 3, and acquires byte count T306 of an index in which a monitoring target agrees with target data columns T301 to T304. Column T707 includes the data conservation count of log data of the configuration. The data count is also tabulated in a manner similar to the operations in the conservation capacity. However, a row count but not a byte count is counted. Counting is made simply for a row count in the case of "raw data," compression target data count T206 in the case of "compressed data," and data count T307 of the index in the case of "index," respectively.

FIG. 10 is a diagram showing an example of individual policy information T900 of configuration changes. Individual policy information T900 includes data that describes a level that each tenant requires for an individual configuration to be changed upon the configuration changes of log database 3. In the present embodiment, when configuration changes proposal generating unit 82 creates configuration changes proposal, the unit 82 judges whether or not an individual configuration satisfies the level, and presents only a level that satisfies the level as the configuration changes proposal. In the present embodiment, at least one of individual policy information T900 is to be configured for every tenant. If a plurality of individual policy information T900 are configured by one tenant, configuration to be changed only needs to meet any criterion among the plurality of individual policy information T900. Column T901 presents ID for uniquely specifying individual policy information T900. Column T902 includes a name of a tenant who configures the policy. Columns T903 to T905 include a level of a metrics for a tenant to require for an individual configuration to be changed. In the present invention, upon generating the configuration changes proposal, three kinds of metrics values for evaluating the individual configuration to be changed are calculated. When the calculated metrics value satisfies a level presented in columns T903 to T905, the configuration is adopted. Hereinafter, the metrics for evaluating the individual configuration to be changed is to be referred to as an individual metrics.

Column T903 includes a level of individual metrics M1 for evaluating time required for the configuration changes, namely, time needed for the configuration changes. The time required for the configuration changes is an important metrics in determining the configuration of log database 3. The reason is that further cost is required during the configuration changes, in comparison with the normal time, and a risk of opportunity loss increases, and therefore the period is desirably shortened as much as possible. On generation of the configuration changes, data processing such as batch addition and deletion processing of log data is performed. During the data processing, log data unconformity or performance degradation by lock of data may be generated. In order to avoid the influence, the configuration changes are generally performed in a specific time zone such as a system usage stop day and a holiday. Whether the processing for the configuration changes is completed within the time zone becomes a large metrics for the operations manager. In the present embodiment, assumed processing time required for the configuration changes is used as one example of metrics M1. In column T903, conditions to be met by a metrics value used for evaluating metrics M1 are configured. For example, row T950 presents that a level of metrics M1 is configured as "less than 60 minutes in time required for the configuration changes" in a certain individual policy. In the present case, configuration of a log database requiring 60 minutes or more is judged to be configuration that does not meet the policy. In addition, when setting of a level for the metrics is not needed, "unlimited" is configured. The configuration is also similar to the metrics described hereinafter.

In the present embodiment, metrics M1 is evaluated using processing time, but is evaluated by a method without limiting to the evaluation method. For example, the configuration changes needs human work man-hour, and has a means for measurement and prediction therefor, the work man-hour may be included in metrics M1.

Column T904 includes a level of individual metrics M2 for evaluating performance change with configuration changes. Performance is an important metrics in determining configuration of log database 3. The reason is that the performance influences time required for monitoring work, and therefore a predetermined or higher level of performance is needed in accomplishing the monitoring work. For example, a restoration time target during fault occurrence is generally determined in service monitoring. During the fault occurrence, log database 3 is utilized for a cause analysis. Therefore, time required for fault restoration depends on response time required for log data search. Accordingly, a predetermined level of response performance is required for log database 3 in order avoid hindering the monitoring work. In an example in the present embodiment, a response time increase and decrease amount before and after the configuration changes is used as one example of metrics M2. An average of response time in a server per N data of search hit data counts is used for the response time. Hereinafter, the response time per N data of the search hit data counts is to be referred to as criterial response time for convenience. In column T904, conditions to be met by a metrics value applied to evaluating metrics M2 are configured. For example, row T950 presents that a level of metrics M2 is configured to "1 second or more in a decrease of criterial response time with the configuration changes" in a certain individual policy. In the present case, configuration at which the response time is not improved by 1 second or more is judged to be configuration that does not meet the policy.

The description above is taken as one example, and metrics M2 is evaluated by a method without limiting to the evaluation method. For example, response time including processing in a client, and a network, as well as the response time in the server, may be used as the response time used for the metrics. Moreover, a CPU utilization rate or the like but not the response time may be used as the increase and decrease amount of performance. Alternatively, if a means for measurement and prediction exists, execution time of monitoring work by the operations manager may be applied as the metrics.

Column T905 includes a level of individual metrics M3 for evaluating data volume change with configuration changes. The data volume is an important metrics in determining configuration of log database 3. The reason is that cost is further required for maintenance and management as a log data volume increases. In an example in the present embodiment, a conservation data increase and decrease volume before and after the configuration changes is used as one example of metrics M3. A data conservation amount predicted when log data for a configured retention is accumulated is used for the data conservation amount. Hereinafter, the data conservation amount is to be referred to as a criterial data conservation amount for convenience. Conditions to be met by the metrics value applied to evaluating metrics M3 are configured in column T904. For example, row T951 presents that a level of metrics M3 is configured to "1 GB or more in reduction of criterial data conservation amount with the configuration changes" in a certain individual policy. In the present case, configuration at which the data conservation amount is not improved by 1 GB or more is judged to be configuration that does not meet the policy.

The description above is taken as one example, and metrics M3 is evaluated by a method without limiting to the evaluation method. For example, a data conservation amount per unit of time may be used.

In addition, in the present embodiment, only a configuration of log database 3 that meets all of the three levels of metrics M1, M2 and M3 of individual policies is regarded as a configuration meeting the individual policy. For example, the configuration of log database 3 meeting the policy in row T951 is a configuration meeting "less than 60 minutes in time required for the configuration changes," "less than 1 second in an increase of criterial response time with the configuration changes" and "1 GB or more in reduction of criterial data conservation amount with the configuration changes."

FIG. 11 is a diagram showing an example of entire policy information T800 of configuration changes. Entire policy information T800 includes data describing a level that each tenant requires for the entire configuration changes upon the configuration changes of log database 3. In the present embodiment, when configuration changes proposal generating unit 82 creates the configuration changes proposal, the unit 82 judges whether the configuration changes proposal as a whole meets the level, and when the level is met, presents the proposal. In the present embodiment, only one of entire policy information T800 is to be configuration for every tenant. Column T801 presents ID for uniquely specifying entire policy information T800. Column T802 includes a name of the tenant who configures the policy. Columns T802 to T805 includes a metrics level that a tenant requires for the configuration changes as the whole. In the present invention, three kinds of metrics values for evaluating the changes proposal as the whole are calculated upon generating the configuration changes proposal. When the calculated metrics values meet levels presented in columns T803 to T805, the configuration is adopted. Hereinafter, the metrics evaluating the changes proposal as the whole is to be referred to as an entire metrics.

Column T803 includes a level of entire metrics M4 for evaluating time required for configuration changes. The metrics corresponds to metrics M1 of individual policy information, and the content is almost same therewith, but different therefrom in evaluating the time by gross time required for all configuration changes.

Column T804 includes a level of entire metrics M5 for evaluation performance change with configuration changes. The metrics corresponds to metrics M2 of individual policy information, and the content is almost same therewith, but different therefrom in evaluating the performance change by all of the performance of the configuration changes. More specifically, in an example in the present embodiment, an average of criterial response time regarding all configuration after change is used as metrics M5.

Column T805 includes a level of entire metrics M6 for evaluating data volume change with configuration changes. The metrics corresponds to metrics M3 of individual policy information, and the content is almost same therewith, but different therefrom in evaluating the change by a total value of data conservation amount of all log data after change.

In addition, in the present embodiment, the configuration changes proposal need to meet all of the three levels of metrics M4, M5 and M6 of the entire policy in a manner similar to the individual policy. For example, the configuration changes proposal of tenant A presented in row T850 need to meet "less than 300 minutes in a total of time required for the all configuration changes" and "less than 10 seconds in an average of criterial response time regarding the all configuration after the change," and "less than 100 GB in a data conservation amount of the all log data after the change." Configuration changes proposal of tenant B presented in T851 need to meet "less than 300 minutes in a total of time required for all configuration changes," and "less than 5 seconds in an average of criterial response time regarding the all configuration after the change" and "less than 50 GB in a data conservation amount of all log data after the change."

The entire metrics used in the description above is taken as one example and application of the present invention is not limited to the evaluation methods.

In the present embodiment, entire policy information T800 is to be applied by one for one tenant, but a plurality of entire policy information T800 may exist for one tenant in a manner similar to individual policy information T900.

In the present invention, individual policy information T900 and entire policy information T800 are configured in a unit of the tenant, but the embodiment according to the present invention is not limited to the present method. For example, the policy information may be categorized and configured not only for every tenant but also for every data type name or instance name. Alternatively, the policy information may be configured for every data conservation format. For example, a policy for every data type is determined in individual policy information T900, and then a total value of a plurality of instance metrics values may be used for a level value (example: less than 10 GB in a total value of criterial data conservation amount of all the instances of a certain data type).

Moreover, the policy information may be configured by explicit input from the operations manager, or may be automatically configured mechanically.

The present invention also allows generation of the configuration changes proposal without using policy information at all, as long as the metrics value is calculated. For example, the configuration changes proposal may be generated by preliminarily determining what metrics has priority, and sequentially selecting better configuration having a high priority metrics value.

Figure 12:
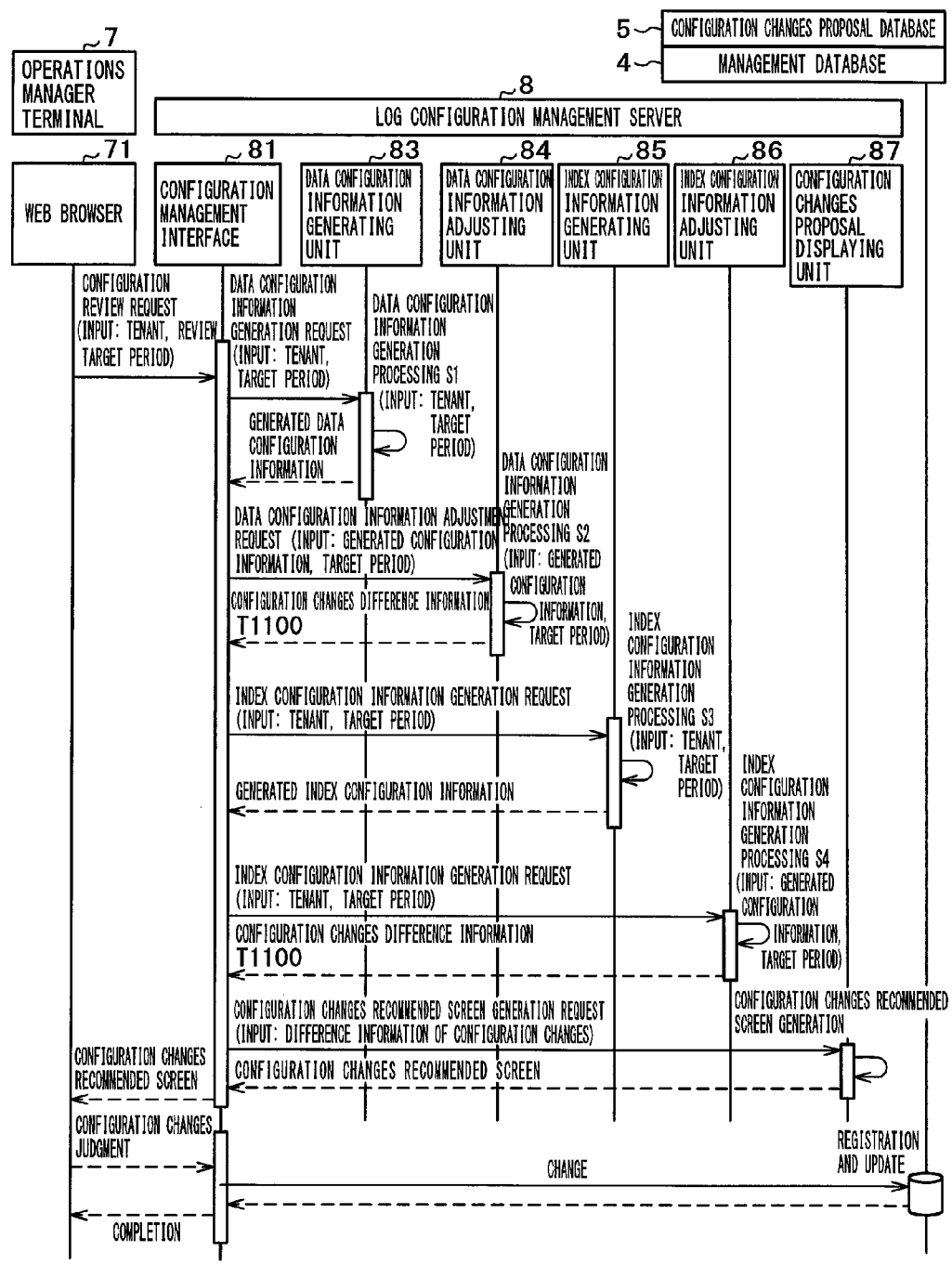
FIG. 12 shows a sequence of configuration changes proposal generation in a first embodiment.

FIG. 12 shows a sequence of configuration changes proposal generation processing in a first embodiment according to the present invention.

Configuration management interface 81 of log configuration management server 8 browses, upon request of configuration review request from operations manager terminal 7 of a tenant, configuration information of log database 3 of the tenant managed by the operations manager to perform configuration changes. Configuration changes proposal generating unit 82 of log configuration management server 8 (data configuration information generating unit 83, data configuration information adjusting unit 84, index configuration information generating unit 85, index configuration information adjusting unit 86 and configuration changes proposal displaying unit 87) is invoked on occasion of the request from the operations manager through configuration management interface 81, uses the information stored in management database 4 to analyze a utilization situation of log database 3 of the tenant to automatically generate the configuration changes proposal in conformity with the situation and to display the changes proposal on a screen of operations manager terminal 7 of the tenant. The changes proposal approved by the tenant manager is stored in configuration changes proposal database 5.

Subsequently, a detailed flowchart for an individual unit in FIG. 12 is described. In addition, information to be generated in connection with configuration changes proposal generation processing and to be stored in configuration changes proposal database 5 is also described in detail.

Figure 13:
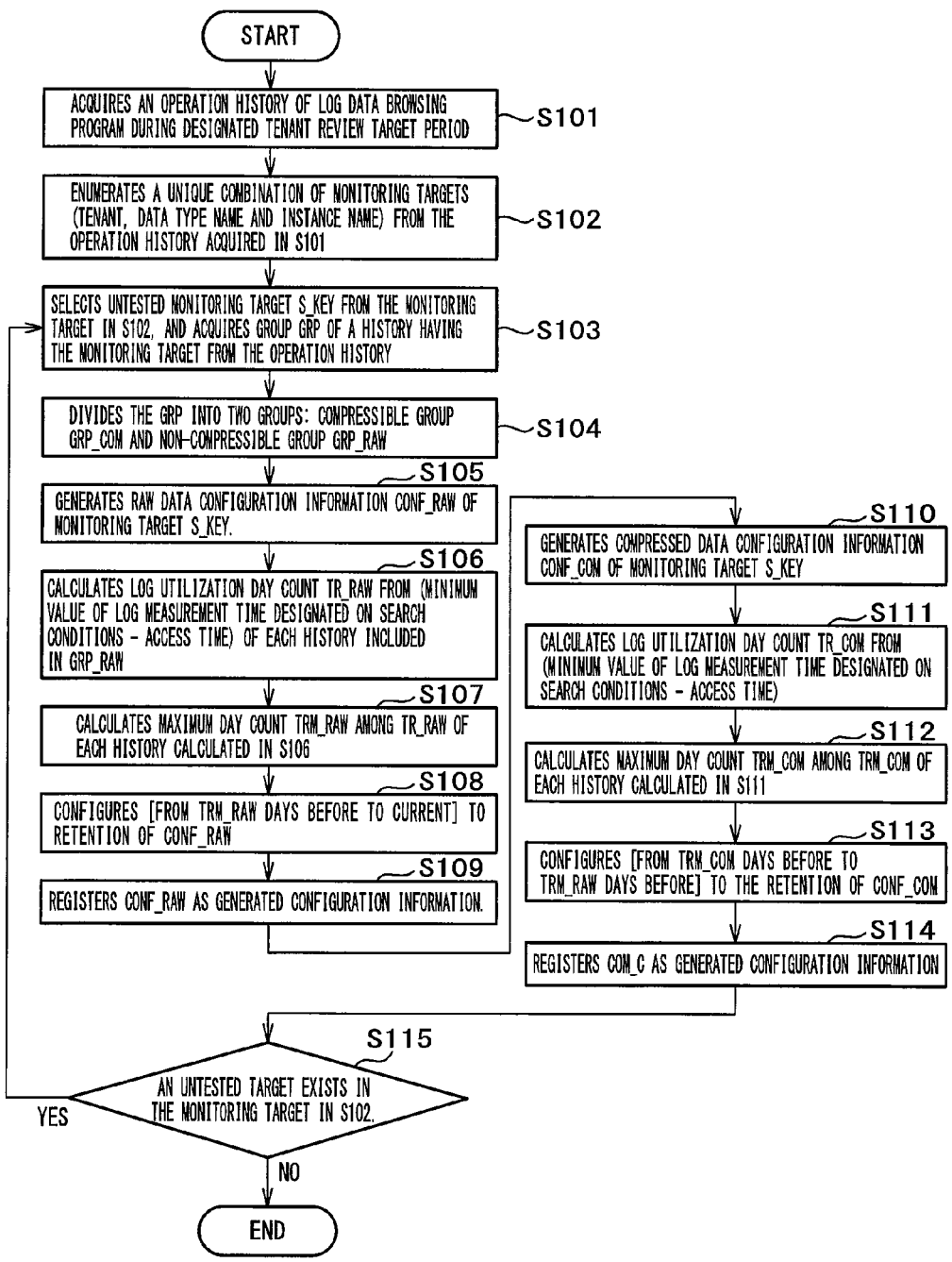
FIG. 13 shows a flowchart of data configuration information generation processing of a data configuration information generating unit in a first embodiment.

FIG. 13 shows a flowchart of data configuration information generation processing by data configuration generating unit 83. In the processing, raw data configuration information and compressed data configuration information are generated.

Data configuration generating unit 83 acquires, upon configuration review request from an operations manager through configuration management interface 81, operation history T500 of log monitoring unit 63 during designated tenant review target period (S101). Here, in the present embodiment, an example is described in which the review target period is assumed to be a period from time on which the configuration changes is executed in previous time to current. The period is assumed to be about one month. However, the embodiment according to the present invention is not limited to the review target period. For example, if each history is conserved for every configuration changes, review for a long period of time over a plurality of configuration changes can also be executed in a manner similar to the operations in the first embodiment.

Next, data configuration generating unit 83 enumerates a unique combination of monitoring targets (tenant, data type name and instance name) from operation history T500 acquired in S101 (S102). On operation history T500, the tenant can acquire the data type name from column T502, and the instance name from column T506.

Subsequently, data configuration generating unit 83 repeats processing in S103 to S114 for the monitoring targets enumerated in S102.

Data configuration generating unit 83 selects untested monitoring target S_KEY from the monitoring targets enumerated in 5102, and acquires group GRP of a history having information presenting the monitoring target from operation history T500 (S103). Then, data configuration generating unit 83 divides the GRP into two groups: compressible group GRP_COM and non-compressible group GRP_RAW (S104). As a judging method thereof, for example, if access T510 to compressed data is "present", and response time T507 required for search is less than threshold T1 in operation history T500, the operation history T500 (search target thereof) is judged to be compressible data. Threshold T1 may be preliminarily determined individually (example: 20 seconds), or may be otherwise. For example, calculation may be made by another means or a level of metrics M5 of entire policy information T800 may be used as T1. Provision of a threshold herein is made for the purpose of avoiding a situation of excessively poor response time by searching the compressed data. For the purpose, discrimination may be made only by existence or not-existence of access to the compressed data without limiting the time by the threshold. Moreover, a method may also be applied in which the all operation histories are used for generation of raw data configuration information without performing the judgment per se described above.

In S105 to S109, raw data configuration 1300 information is generated based on operation history T500 of GRP_RAW.

Configuration in conformity with actually accessed data can be generated by performing the processing. First, data configuration generating unit 83 generates configuration information CONF_RAW of raw data of monitoring target S_KEY (S105). Here, as an initial value of CONF_RAW, the unit 83 designates an expression (monitoring target=S_KEY, data conservation format=raw data, and retention=[unlimited, to current]). The designation presents a configuration state in which the retention is not particularly limited. Next, data configuration generating unit 83 calculates log utilization day count TR_RAW for every history included in GRP_RAW (S106). Here, TR_RAW is determined by an expression (minimum value of log measurement time designated on search conditions−access time) of operation history T500. The calculation allows determination of access to log data in any old period starting from the access time. Then, data configuration generating unit 83 calculates maximum day count TRM_RAW among TR_RAW of each history calculated in S106 (S107). Then, data configuration generating unit 83 configures an expression [from TRM_RAW days before to current] to retention of CONF_RAW (S108). Finally, data configuration generating unit 83 registers CONF_RAW as generated configuration information (S109). In addition, a case where no history exists in GRP_RAW can be considered. In the present case, processing in S105 to S109 is omitted.

In S110 to S114, compressed data configuration information is generated based on operation history T500 of GRP_COM. A general processing flow is similar to the flow of raw data configuration information generation in S105 to S109. Configuration in conformity with actually accessed compressible data can be generated by performing the processing. First, data configuration generating unit 83 generates compressed data configuration information CONF_COM of monitoring target S_KEY (S110). Here, as an initial value of CONF_COM, the unit 83 designates an expression (monitoring target=S_KEY, data conservation format=compressed data, retention=[unlimited, to current]). The designation presents a configuration state in which the retention is not particularly limited. Next, data configuration generating unit 83 calculates log utilization day count TR_COM for every history included in GRP_COM, and calculates the maximum day count TRM_COM (S111 to S112). The calculation method is similar to the method for TR_RAW and TRM_COM. Then, data configuration generating unit 83 configures an expression [from TRM_COM days before to TRM_RAW days before] to retention of CONF_COM (S113). Here, configuration of an end time point of the retention to a start time point of the raw data configuration retention is made for the purpose of continuing the data retention. Finally, data configuration generating unit 83 registers generated CONF_COM as configuration information (S114). In addition, a case where no history exists in GRP_COM can be considered in the processing. In the present case, processing in S110 to S114 is omitted.

FIG. 14 is a diagram showing an example of configuration information T1200 after being changed upon configuration review request from an operations manager. Column T1201 includes ID for uniquely identifying a log database configuration. Columns T1202 to T1204 include information presenting a monitoring target. Column T1205 presents a data conservation format to be designated for the monitoring target. Column T1206 presents a target data column to be indexed. Column T1207 includes data retention to be configured.

Configuration information T1200 after the change is generated by configuration changes proposal generating unit 82, and includes the configuration meeting the entire metrics and the individual metrics of the policy. Row T1250 includes information presenting the monitoring target being raw data, and row T1251 includes a compressed data retention configuration of the monitoring target. Rows T1252 to T1254 include an index configuration to raw data having information presenting the monitoring target identical with the target in row T1250. The content of the column constituting the information is similar to the content of current configuration information shown in FIG. 8, and therefore the description is omitted.

In compressed data configuration information generation processing in the present embodiment, the start time point of the retention is calculated based on the access situation, but the start time point may be configured to "unlimited" without performing the calculation. A risk of excessive data deletion can be suppressed by configuring no limit. In the present case, compressed data are not automatically deleted, and are deleted only by operation by the operations manager.

Moreover, in data configuration information generation processing in the present embodiment, the configuration information retention is designated to the maximum value of the expression (the minimum value of log measurement time designated on the search conditions–access time) of operation history T500, but a value obtained by multiplying a safety factor (example: 1.2 times) to the maximum value may be used. The process is effective in the case where use of the log is just started, and the utilization day count may increase, or the like.

Figure 15:
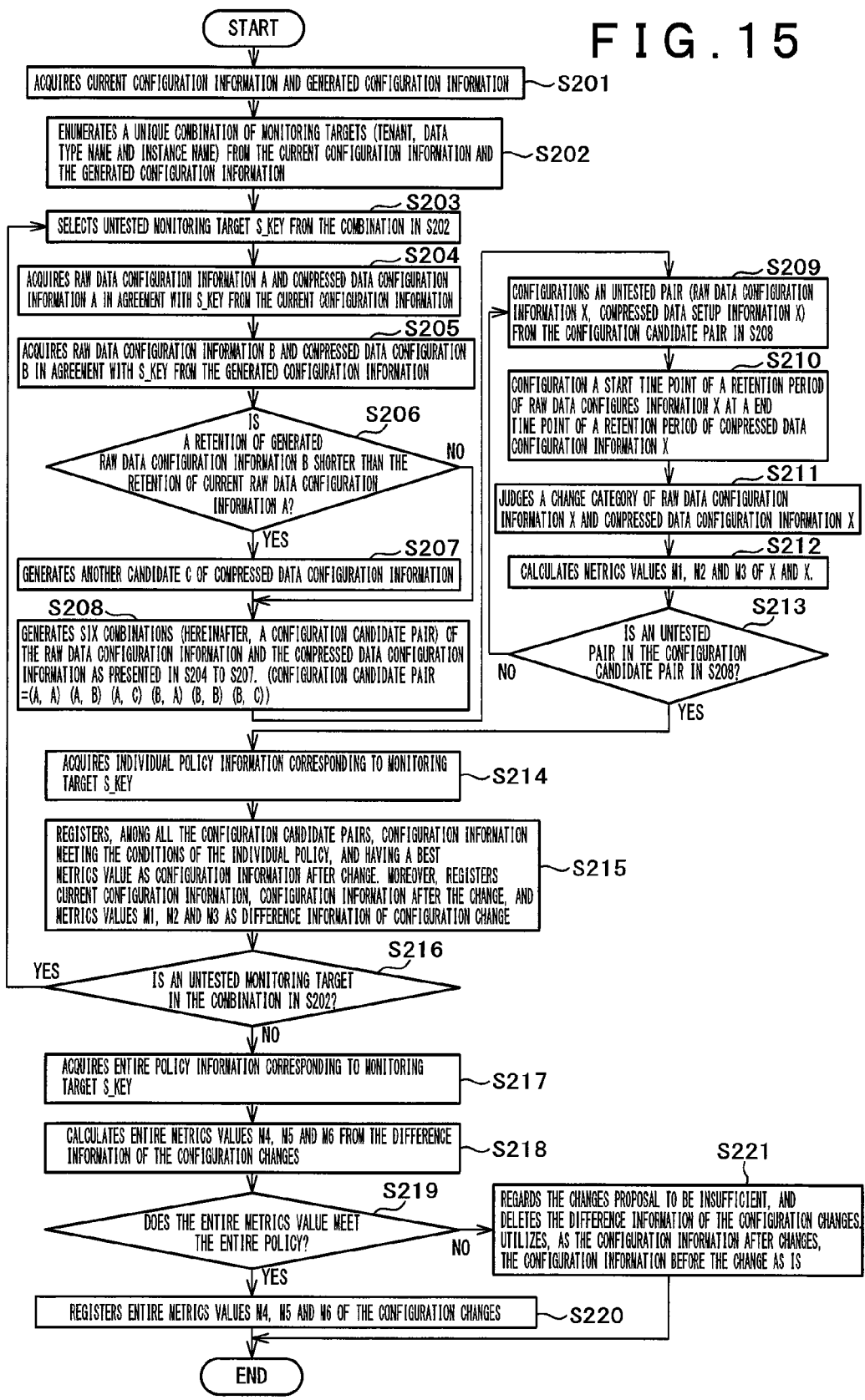
FIG. 15 shows a flowchart of data configuration information adjustment processing of a data configuration information adjusting unit in a first embodiment.

FIG. 15 shows a flowchart of data configuration information adjustment processing by data configuration adjusting unit 84. Data configuration adjusting unit 84 judges, after data configuration information generation processing shown in FIG. 13 finishes, whether generated configuration information T1200 meets a configuration changes policy to adjust generated configuration information T1200, thereby generating final configuration changes proposal. The flow is described below.

First, data configuration adjusting unit 84 acquires current configuration information T600 (FIG. 8) from management database 4, and generated configuration information T1200 (FIG. 14) from data configuration generating unit 83, respectively (S201). Next, data configuration adjusting unit 84 enumerates a unique combination of monitoring targets (tenant, data type name and instance name) from current configuration information T600 and generated configuration information T1200 as acquired in S201 (S202).

Subsequently, data configuration adjusting unit 84 repeats processing in S203 to S215 for the monitoring targets enumerated in S202.

Data configuration adjusting unit 84 selects untested monitoring target S_KEY from the monitoring targets enumerated in S202 (S203). Then, data configuration adjusting unit 84 acquires raw data configuration information A and compressed data configuration information A in agreement with S_KEY from current configuration information T600 (S204). Moreover, the unit 84 acquires raw data configuration information B and compressed data configuration information B in agreement with S_KEY from generated configuration information T1200 in a similar manner (S205).

Next, when retention of generated raw data configuration information B is shorter than the retention of current raw data configuration information A, data configuration adjusting unit 84 generates another candidate C of compressed data configuration information so as to retain compressed data for a period of the difference (S206 to S207). The process is applied for relieving generation of excessive data deletion based on reducing the raw data retention. The unit 84 provides a configuration value of compressed data configuration information C with an expression (monitoring target=S_KEY, data conservation format=compressed data, retention=[from time on which retention starts in current raw data configuration information B to time on which retention starts in generated raw data information A]).

Furthermore, data configuration adjusting unit 84 finds out a best configuration combination from the raw data configuration information and the compressed data configuration information as presented above, and registers the combination as configuration information of monitoring target S_KEY after change (S208 to S215). First, the unit 84 generates six combinations (hereinafter, configuration candidate pair) of raw data configuration information and compressed data configuration information as presented in S204 to S207 as described below (S208).

An expression (configuration candidate pair=(A, a) (A, b) (A, c) (B, a) (B, b) (B, C)).

Then, data configuration adjusting unit 84 repeats processing in S209 to S212 for the configuration candidate pair in S208.

Data configuration adjusting unit 84 selects an untested pair (raw data configuration information X, compressed data configuration information x) from the configuration candidate pair in S208 (S209). Then, data configuration adjusting unit 84 configures a start time point of the retention of raw data configuration information X at a end time point of the retention of compressed data configuration information x (S210). The configuration includes processing for allowing continuation of the retention in the compressed data configuration and the raw data configuration. Next, data configuration adjusting unit 84 judges a change category of raw data configuration information X and compressed data configuration information x (S211). The unit 84 judges the category as a change category "addition" when current configuration information is empty, a change category "deletion" when configuration information (X or x) selected from the configuration candidate pair is empty, and a change category "change" when both are not empty. Furthermore, in the case of the change category "change," when the configuration information is completely in agreement therewith, no change is made, and therefore subsequent processing is omitted.

Next, data configuration adjusting unit 84 calculates values of metrics M1, M2, and M3 of raw data configuration information X and compressed data configuration information x, respectively (S212). Subsequently, one example of the calculation method of each metrics value is given.

Assumed processing time required for the configuration changes is used for metrics M1 in the present embodiment as described above. An example of the calculation method for the processing time is presented. In the present embodiment, a performance unit price and a trend for every category or every target of the configuration changes are to supposedly be known. The performance unit price, current configuration information T600, configuration information after the change (configuration information selected from the configuration candidate pair, herein), and data volume information T700 are used, and calculation is to be made according to expressions 1-1 and 1-2 described below.

Assumed processing time required for configuration changes=performance unit price required for configuration changes per one data count×data count to be processed (expression 1-1).

Data count to be processed=conservation data count T707 of configuration ID T701 identical with the configuration information in data volume information T700×ABS (a day count of retention of configuration information after change)−a day count of retention of current configuration information)÷a day count of the retention of the current configuration information (function ABS( ) refers to a function for calculating an absolute value in a parenthesis, herein)   (expression 1-2).

An example is presented in which actual values are applied to the calculation expressions. First, a performance unit price of deletion processing per count is assumed to be 1 millisecond/data in raw data deletion processing. Moreover, the day count of the retention of the current configuration information is assumed to be 100 days, and the day count of the retention of the configuration information after the change is assumed to be 80 days. Furthermore, the conservation data count is assumed to be 10 million counts. In the present case, assumed processing time required for the configuration changes is calculated to be "[1 millisecond/data×10 million counts× ABS (80 days−100 days)÷100 days=2,000 seconds=33 minutes."

In the present embodiment, the example is given in which the performance unit price is known, but the present invention is restricted thereto. For example, when a performance unit price is unknown, addition or deletion processing is performed on actual equipment using a small volume of log data for mechanically understanding a performance unit price, and then the performance unit price may be determined from the measuring results for the time. Moreover, when the trend is unknown, a trend of a past configuration changes track record may be analyzed by applying a multivariate analysis technique. For example, when processing time depends on a data volume during retention, a prediction calculation expression is determined by conducting a statistical analysis of the past configuration changes track record, and the expression may be applied to calculation of metrics M1.

In the present embodiment, as described above, the change amount of the reference response time in connection with the configuration changes is used for metrics M2. In the present embodiment, an analysis of response time after the change is assumed to be allowed from a trend of a past operation history, and is calculated using operation history T500, current configuration information T600, configuration information after the change (configuration information selected from the configuration candidate pair herein), and data volume information T700 according to expressions below.

Change amount of criterial response time=criterial response time of configuration information after change−criterial response time of current configuration information   (expression 2-1).

Criterial response time of current configuration information=an average of criterial response time of the all operation history of a monitoring target identical with the target of the configuration information   (expression 2-2).

Criterial response time of an operation history=response time required for search×(N data in a data count serving as a criterial÷data hit in search)   (expression 2-3).

Criterial response time of configuration information after change=Criterial response time of current configuration information×performance improvement coefficient by change   (expression 2-4).

Performance improvement coefficient by the change=func (data row counts of indices to be used after change, access to compressed data after the change)   (expression 2-5).

Here, the performance improvement coefficient by the change is to be expressed using a numeric value of 0 to 1, and as the numeric value is smaller, the performance is presented to be better. Function func ( ) for determining the coefficient includes a prediction expression determined by a statistical analysis (for example, multiple regression analysis) of a performance trend using as input parameters the data row counts of indices used for search of the past operation history, and information on existence or not-existence of access to compressed data.

The calculation method for metrics M2 in the present embodiment is taken as one example, and therefore any other calculation method may be applied. For example, another machine learning technique such as a neutral network may also be applied.

As described above, the change volume of data conservation amount before and after the configuration changes is used for metrics M3 in the embodiment. In the embodiment, a analysis of the data conservation amount after the change is to be allowed from a trend of data volume information T700, and is calculated using current configuration information T600, configuration information after the change (configuration information selected from the configuration candidate pair herein), and data volume information T700 according to expressions as described below.

Change volume of criterial data conservation amount=data conservation amount T706 having configuration ID T701 identical with the configuration ID of configuration information in data volume information T700×ABS (day count of retention of configuration information after change−day count of retention of current configuration information+a day count of retention of current configuration information   (expression 3-1).

In the calculation described above, when a category of configuration changes is addition, data conservation amount T706 having configuration ID T701 identical with the configuration ID of configuration information in data volume information T700 does not exist. In the present case, the change amount is to be presumed from an alternative means described below. In order to allow presumption herein, in the present embodiment, a compression ratio for converting raw data into compressed data, and a ratio of a data volume in comparison with the raw data in the case of generating an index are assumed to be known. When the data conservation amount of the identical monitoring target exists, a data volume is acquired using the numeric value, and a value obtained by multiplying the numeric value with the compression ratio and the ratio of data volume as described above is used. Moreover, when the data conservation amount of the identical monitoring target does not exist at all, an average of the data conservation amount of other all other monitoring targets is to be used.

The calculation method of metrics M3 in the present embodiment is taken as one example, and therefore any other calculation method may be applied. For example, if the retention is also calculated upon calculating data volume information T700 and the calculated period is taken into consideration during calculating metrics M3, accuracy of evaluation can be further improved.

After calculation of the individual metrics finishes by the method described above, data configuration adjusting unit 84 acquires individual policy information T900 corresponding to monitoring target S_KEY (S214). Then, among the all configuration candidate pairs, configuration information meeting the individual policy conditions, and having a best metrics value is registered as configuration information T1200 after the change. Moreover, the unit 84 registers current configuration information T600, configuration information T1200 after the change and values of metrics M1, M2 and M3 values as difference information of configuration changes (S215). Here, how to select configuration information having the best metrics value includes, for example, a method for sorting configuration candidate according to priority of a data conservation format and an individual metrics as preliminarily determined (example: raw data configuration information takes priority as the data conservation format, and also the metrics takes priority in the order of M2, M3 and M1) and selecting the most significant configuration information.

As a result of repeating the operations in S203 to S216 as described above, configuration information T1200 after the change and difference information T1100 of the configuration changes are registered. Then, data configuration adjusting unit 84 distinguishes whether the configuration changes meets the entire policy. First, the unit 84 acquires entire policy information T800 corresponding to monitoring target S_KEY (S217). Then, the unit 84 calculates entire values of metrics M4, M5 and M6 values from difference information T1100 of the configuration changes (S218). Hereinafter, one example of the calculation method of each metrics value is given.

Metrics M4 in the present embodiment is evaluated by gross time required for the all configuration changes. A calculation method is almost similar to the method presented in metrics M1 in S212. However, in metrics M4, gross time required for the all configuration changes is calculated. Therefore, a total value of assumed processing time (determined according to expression 1-1) required for the all configuration changes is calculated, and a result thereof is set as a value of metrics M4.

A calculation method of metrics M5 in the present embodiment is almost similar to the method presented in metrics M2 in S212. However, in metrics M5, an average of criterial response time for the all configuration after the change is calculated. Therefore, first, criterial response time of configuration information after the change is calculated for configuration information T1200 after the all change using expressions 2-4. Then, an average of determined all criterial response time is calculated, and a result thereof is set as a value of metrics M5. Here, "index data column to be used after change" and "existence or not-existence of access to compressed data after change" serving as input values of expressions 2-5 are to be estimated by comparison between search conditions T504 to T506 in operation history T500 and configuration information T1200 after the change. For example, configuration information T1200 after change in which the data columns used in search conditions T504 to T506 in operation history T500 and a data column of index target data T600 in configuration information T1200 after the change are most agreed is regarded as the index data column to be used in search of operation history T500 thereof.

A calculation method of metrics M6 in the present embodiment is almost similar to the method presented in metrics M3 in S212. However, in metrics M6, a total value of a data conservation amount of all log data after change is calculated. Therefore, an individual data conservation amount of configuration information T1200 after the change is calculated using the following expression 3-2 obtained by correcting expression 3-1, and a total value is determined.

Criterial data conservation amount=data conservation amount T706 having configuration ID T701 identical with the ID of configuration information in data volume information T700×a day count of retention of configuration information after change÷a day count of retention of current configuration information    (expression 3-2).

Next, data configuration adjusting unit 84 compares between entire policy information T800 and calculated entire values of metrics M4, M5 and M6, and distinguishes whether configuration information T1200 after the change meets a level (S219). When the level is met, the unit 84 registers M4, M5 and M6 as entire metrics value T1300 of the configuration changes (S220). When the level is not met, the unit 84 regards the changes proposal to be insufficient, and deletes difference information T1200 of the configuration changes. As configuration information T1200 after the change, the unit 84 uses configuration information T600 before the change as is (S221).

In S221 in the present embodiment, when the entire metrics value does not meet entire policy information T800, the unit 84 regards the metrics value to be insufficient as the changes proposal to terminate processing, and uses configuration information T600 before the change as is. The reason of terminating processing is for minimizing a calculation amount. Therefore, when consideration of the calculation amount is not needed, a calculation result up to S215 is left, another configuration that is not selected in S215 is reregistered, and recalculation may be made. Alternatively, an entire metrics value is calculated for combinations of all of configurations that meet individual policy information T900, and configuration having a best entire metrics value may be adopted from the entire metrics values.

Moreover, judgment processing whether or not the entire policy is met is not executed individually, and may be executed after processing finishes up to adjustment processing of the below-mentioned index configuration information.

Furthermore, all of metrics M1 to M6 are not needed to be used for judgment. For example, metrics M2 and M5 also depends on a later-determined index configuration, and therefore are omitted in the data configuration information adjustment processing, and calculation and judgment of metrics M2 and M5 may be collectively executed upon index configuration information adjustment processing.

FIG. 16 is a drawing showing an example of difference information T1100 of the configuration changes. Configuration changes difference information T1100 is generated by configuration changes proposal generating unit 82. In the present embodiment, only configuration to be changed by the latest configuration changes proposal is registered into the difference information T1100 of the configuration changes. In columns T1101 to T1111, configuration information T600 before change (namely, current) and configuration information T1200 after the change are presented. Column T1101 includes ID for uniquely identifying configuration of log database 3. Columns T1102 to T1104 include information presenting a monitoring target. Column T1102 includes a name of a tenant managing log data to be configured herein. Column T1103 includes a name of a data type of log data to be configured herein. Column T1104 includes a name of an instance outputting log data to be configured herein. Column T1105 presents a data conservation format designated for the monitoring target. Columns T1101 to T1105 correspond to columns T601 to T605 of current configuration information T600, and columns T1201 to T1205 of configuration information T1200 after the change. Columns T1107 and T1108 include index target data and retention in configuration information before the change, respectively, and correspond to columns T606 to T607 of current configuration information T600. When configuration is categorized into addition, corresponding current configuration information T600 does not exist, and therefore a symbol "-" is registered into the columns. Columns T1110 and T1111 include index target data and retention in configuration information T1200 after the change, respectively, and correspond to columns T1106 to T1107 of current configuration information T1100. If configuration is categorized into deletion, corresponding configuration information T1200 after the change does not exist, and therefore a symbol "-" is registered into the columns. Column T1112 includes a change category of the configuration changes. Any one of values of "change," "deletion" and "addition" is registered into the change category. Columns T1113 to T1115 include metrics values that are applied to evaluating individual metrics M1 to M3 of the configuration. A specific example is described using row T1150. Row T1150 presents changing a start time point of retention from "180 days before" to "200 days before" for raw data configuration of a monitoring target (tenant A, Web event log of service 1, ap1server1). Results of evaluating the configuration changes present 10 minutes required for the configuration changes (column T1113), a 1 second decrease in criterial response time (column T1114), and a 1 GB decrease in criterial data conservation amount (column T1115). Configuration changes difference information is registered also for rows T1151 to T1154 in a similar manner.

Figure 17:
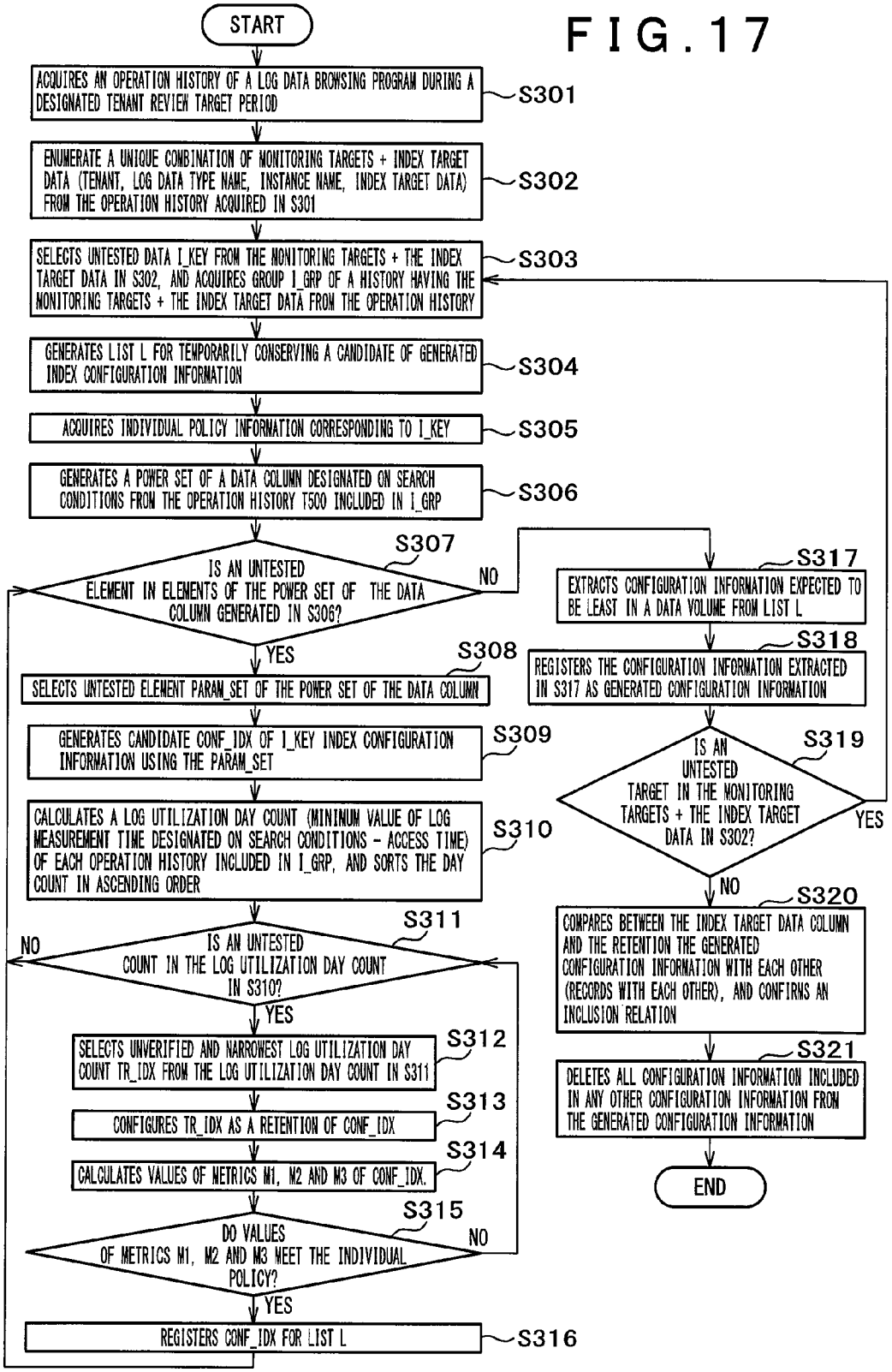
FIG. 17 shows a flowchart of index configuration information generation processing of an index configuration information generating unit in a first embodiment.

FIG. 17 shows a flowchart of index configuration information generation processing by index configuration information generating unit 85 in the first embodiment. A general flow and the processing content partially executed in the flow are similar to the general flow and the content of the flowchart of data configuration information generating unit 83. Therefore, the description is omitted for a part of similar content.

Index configuration information generating unit 85 acquires, upon configuration review request from an operations manager through configuration management interface 81, operation history T500 of log monitoring unit 63 during a designated tenant review target period (S301). The processing is similar to the processing in S101 of data configuration generating unit 83.

Next, index configuration information generating unit 85 enumerates a unique combination of monitoring 1885 target+ index target data (tenant, log data type name, instance name, index target data) from operation history T500 acquired in S301 (S302). As the index target data, the unit 85 uses index T509 used in search on operation history T500. Moreover, in the case of operation history T500 in which an index is not used for search, the unit 85 designates, as an exception, "no target data" into index target data.

Subsequently, index configuration information generating unit 85 repeats processing in S303 to S319 for the monitoring target+index target data as enumerated in S302.

Index configuration information generating unit 85 selects untested data I_KEY from the monitoring target+index target data as enumerated in S302, and acquires group I_GRP of a history having the monitoring target+index target data acquired from operation history T500 (S303).

Then, index configuration information generating unit 85 generates a candidate of new index configuration information corresponding to I_KEY (S304 to S316). First, index configuration information generating unit 85 generates list L for temporarily retaining a generated index configuration information candidate (S304). Next, index configuration information generating unit 85 acquires individual policy information T900 corresponding to I_KEY (S305). Furthermore, the unit 85 generates power set of the data column designated on search conditions (columns T504 to T506) from operation history T500 included in I_GRP (S306). A method in S305 is described by taking row T553 of operation history T500 in FIG. 7 as an example. In the row, "log measurement time" is designated in columns T504 to T505, and "data type name" and "instance name" in column T506, and thus three data columns in total are designated for search. Thus, as the power set of the data column, {{no target data}, {log measurement time}, {data type name}, {instance name}, {log measurement time, data type name}, {log measurement time, instance name}, {data type name, instance name}, {log measurement time, data type name, instance name}} is generated.

Then, index configuration information generating unit 85 repeats processing in S308 to S316 for an element of the power set of the data column generated in S305.

Index configuration information generating unit 85 selects untested element PARAM_SET of the power set of the data column (S308). Further, index configuration information generating unit 85 generates candidate CONF_IDX of index configuration information of I_KEY using the PARAM_SET (S309). In the initial configuration value, the unit 85 designates an expression (monitoring target=monitoring target of I_KEY, conservation format=index, index target data=PARAM_SET, retention=[unlimited, to current]. Furthermore, index configuration information generating unit 85 calculates a log utilization day count of each operation history T500 included in I_GRP (minimum value of log measurement time designated on search conditions–access time), and sorts the day count in ascending order (S310). Then, index configuration information generating unit 85 judges whether untested data are in the log utilization day count calculated in S310 (S311), and if no, the unit 85 regards index configuration information using the PARAM_SET to be insufficient, and returns to processing for selecting next PARAM_SET (S308). If any, the unit 85 selects untested and narrowest log utilization day count TR_IDX from the log utilization day count in S311 (S312). Furthermore, the unit 85 configures the log utilization day count TR_IDX as retention of candidate CONF_IDX of index configuration information (S313). Furthermore, the unit 85 calculates values of metrics M1, M2 and M3 of candidate CONF_IDX of index configuration information (S314). The calculation method applies a method similar to the above-mentioned method. The unit 85 judges whether calculated metrics M1, M2 and M3 meet the individual policy and if met, registers candidate CONF_IDX of the index configuration information into list L (S316). If not met, the unit 85 reselects new TR_IDX (S312).

The unit 85 lists candidates of index configuration information of I_KEY by processing in S304 to S316 as described above, and then selects one of the candidates and registers the candidate as generated configuration information. For the purpose, index configuration information generating unit 85 first extracts configuration information expected to be least in a data volume from list L (S317). Specific examples of the method include a method for selecting configuration information in which a product of an index target data count multiplied by retention is minimized. Processing in S317 includes one example for selecting the best candidate of the list, and the best candidate may be elected by any other method or criteria. Then, index configuration information generating unit 85 registers the configuration information extracted in S317 as generated configuration information (S318).

Index configuration information generating unit 85 repeats processing in S303 to S319 described above, and generates index configuration information, and then eliminates unnecessary index configuration information. For the purpose, the unit 85 compares between the index target data column and the retention of the generated configuration information with each other (records with each other), and confirms an inclusion relation (S320). An index to be included can be alternated by an included index, and therefore is unnecessary. Consequently, the unit 85 deletes all configuration information included in any other configuration information from the generated configuration information (S322). Thus, the data volume can be further saved.

In the configuration information generation processing in the present embodiment, metrics M1 to M6 are all used for judgment. However, all of the metrics are not necessarily used. For example, when metrics M2 and M5 are important, calculation and judgment of the metrics only may be performed.

Figure 18:
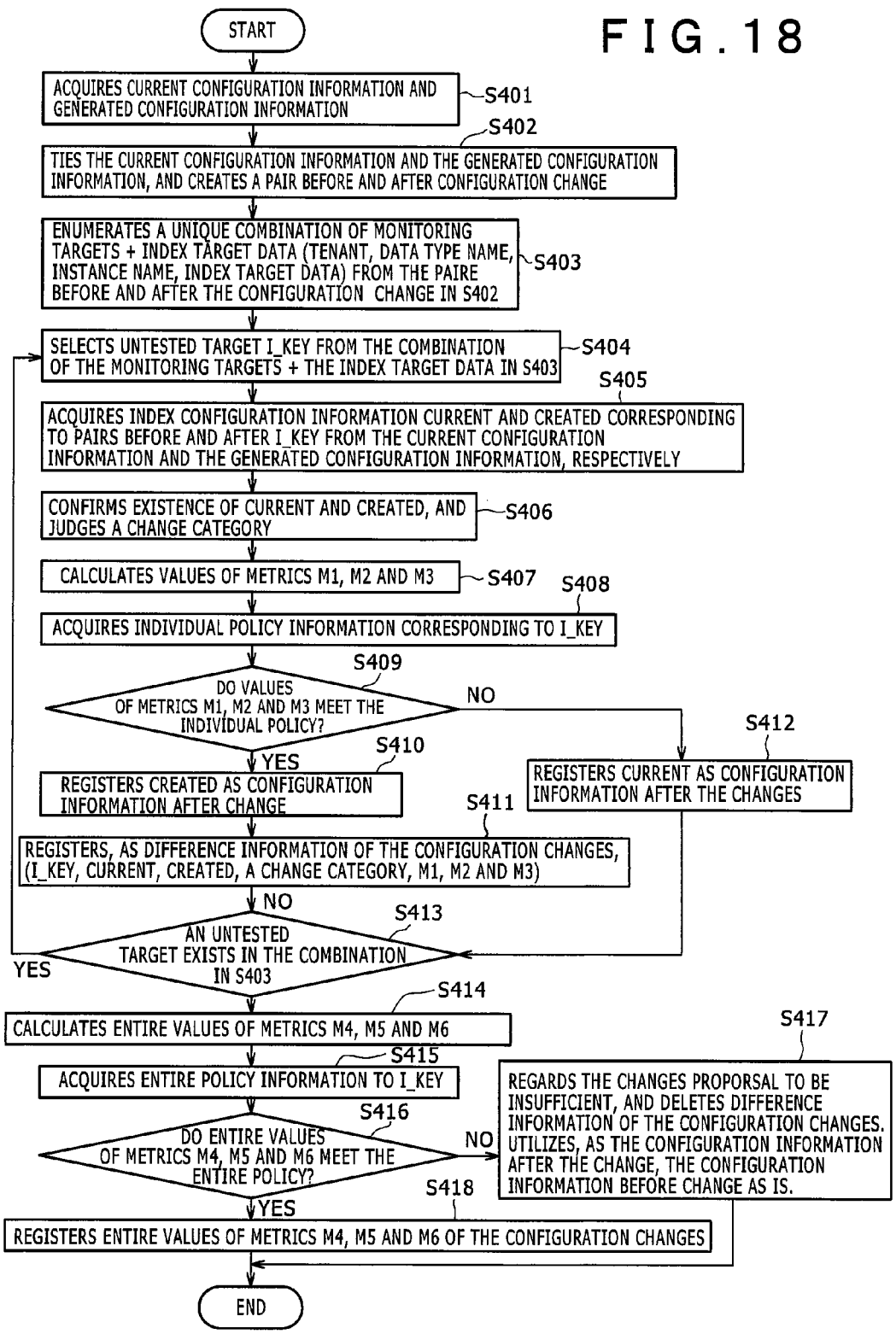
FIG. 18 shows a flowchart of index configuration information adjustment processing of an index configuration information adjusting unit in a first embodiment.

FIG. 18 shows a flowchart of index configuration information adjustment processing by index configuration information adjusting unit 86 in a first embodiment. A general flow of the processing and the processing content partially executed in the flow are similar to the flow and the content in the flowchart of data configuration information adjusting unit 87. Therefore, the description on a part similar in the content is omitted.

Index configuration information adjusting unit 86 judges, after the index configuration information generation processing by index configuration information generating unit 85 shown in FIG. 17 finishes, whether the generated configuration information meets the configuration changes policy, and adjusts generated configuration information, thereby generating final configuration changes proposal. A flow thereof is described below.

First, index configuration information adjusting unit 86 acquires current configuration information T600 from management database 4, and configuration information generated by processing by index configuration information generating unit 85, respectively (S401). Next, index configuration information adjusting unit 86 ties current configuration information T600 acquired in S401, and generated configuration information, and creates a pair before and after configuration changes (S402). One example of the method is given. First, the unit 86 applies as a configuration changes pair in agreement with a monitoring target in a data conservation format and an index target data. Furthermore, when the data conservation format agrees with the format of the monitoring target and the index target data does not agree therewith, the unit 86 applies, as the configuration changes pair, configuration information in which the agreed data column count is largest with each other. For an otherwise configuration, the unit 86 regards the configuration as addition or deletion, and applies as a configuration changes pair in which configuration information before and after change is empty. Next, index configuration information adjusting unit 86 enumerates a unique combinations of monitoring target+index target data (tenant, data type name, instance name, index target data) from the pair before and after the configuration changes in S402 (S403).

Subsequently, index configuration information adjusting unit 86 repeats processing in S404 to S413 for the monitoring target+index target data enumerated in S403.

Index configuration information adjusting unit 86 selects untested target I_KEY from the combination of the monitoring target+index target data in S403 (S404). Next, index configuration information adjusting unit 86 acquires index configuration information CURRENT corresponding to I_KEY from current configuration information T600, and index configuration information CREATED corresponding to I_KEY from the generated configuration information, respectively (S405). Then, index configuration information adjusting unit 86 judges a change category of CURRENT and CREATED (S406). The unit 86 judges the category to be change category "addition" when CURRENT is empty, change category "deletion" when CREATED is empty, and change category "change" when both are not empty.

Then, index configuration information adjusting unit 86 calculates values of metrics M1, M2 and M3 of index configuration information, respectively (S407). A calculation method therefor is as mentioned above. Further, index configuration information adjusting unit 86 acquires individual policy information T900 corresponding to I_KEY (S408), and judges whether calculated values of metrics M1, M2 and M3 meet the individual policy (S409). As a result of judgment, when the values do not meet the individual policy, the unit 86 regards CREATED to be insufficient as change, and registers CURRENT as configuration information T1200 after the change (S412). As a result of judgment, when the values meet the individual policy, the unit 86 registers CREATED as configuration information T1200 after the change (S410). Furthermore, the unit 86 registers, as difference information T1100 of the configuration changes (I_KEY, CURRENT, CREATED, a change category, M1, M2 and M3) (S411).

Index configuration information adjusting unit 86 performs processing described above, and registers configuration information T1100 after the change and difference information T1100 of the configuration changes, and then performs judgment based on entire policy information T800. Index configuration information adjusting unit 86 calculates entire metrics values M4, M5 and M6 from difference information T1100 of the configuration changes (S414). A calculation method therefor is as mentioned above. Next, the unit 86 acquires entire policy information T800 corresponding to I_KEY (S415). Furthermore, index configuration information adjusting unit 86 compares between calculated entire metrics values M4, M5 and M6, and entire policy information T800, and distinguishes whether configuration information T1200 after the change meets a level (S416). When the values meet the level, the unit 86 registers M4, M5 and M6 as entire metrics value T1300 of the configuration changes (S417). When the values do not meet the level, the unit 86 regards the changes proposal to be insufficient, and deletes difference information T1200 of the configuration changes. As configuration information T1200 after the change, the unit 86 uses configuration information T600 before the change as is (S418).

In S418, when entire metrics value T1300 does not meet entire policy information T800, the unit 86 regards the item to be insufficient as the changes proposal to discontinue processing, and uses configuration information T600 before the change as is. The reason of discontinuing processing is for decreasing a calculation amount. For the purpose, when consideration of the calculation amount is not needed, a calculation result of index generation processing is left, and another configuration that is not selected in S317 is reregistered, and recalculation may be made. Alternatively, entire metrics value T1300 is calculated for combinations of all of configurations that meet individual policy information T900, and configuration having a best entire metrics value may be adopted from the entire metrics values.

FIG. 19 is a drawing showing an example of entire metrics value T1300 of the configuration changes. The diagram shows a result obtained by configuration changes proposal generating unit 82 evaluating an entire metrics of difference information T1100 of the configuration changes. Column T1301 includes a name of a tenant who manages log data subjected to configuration changes proposal. Columns T1302 to T1304 include metrics values of entire metrics M4 to M6 of the configuration. For example, entire metrics values of the configuration changes of a tenant presented in row T1350 include "210 minutes in a total of time required for the all configuration changes," "8 seconds in an average of criterial response time for all of configuration after change" and "90 GB in a data conservation amount of all log data after the change," and all meets the policy of entire policy information T800 of the configuration changes.

In the adjustment processing of configuration information in the present embodiment, metrics M1 to M6 are all used for judgment. However, all of the values may not be used for calculation.

Moreover, processing in each flowchart described above can also be executed without using individual policy information T900 and entire policy information T8000. For example, if another means for judging superiority or inferiority of each metrics (priority of a metrics, or the like) exists, the method is applied as an alternative, and the method according to the present invention may also be executed.

Figure 20:
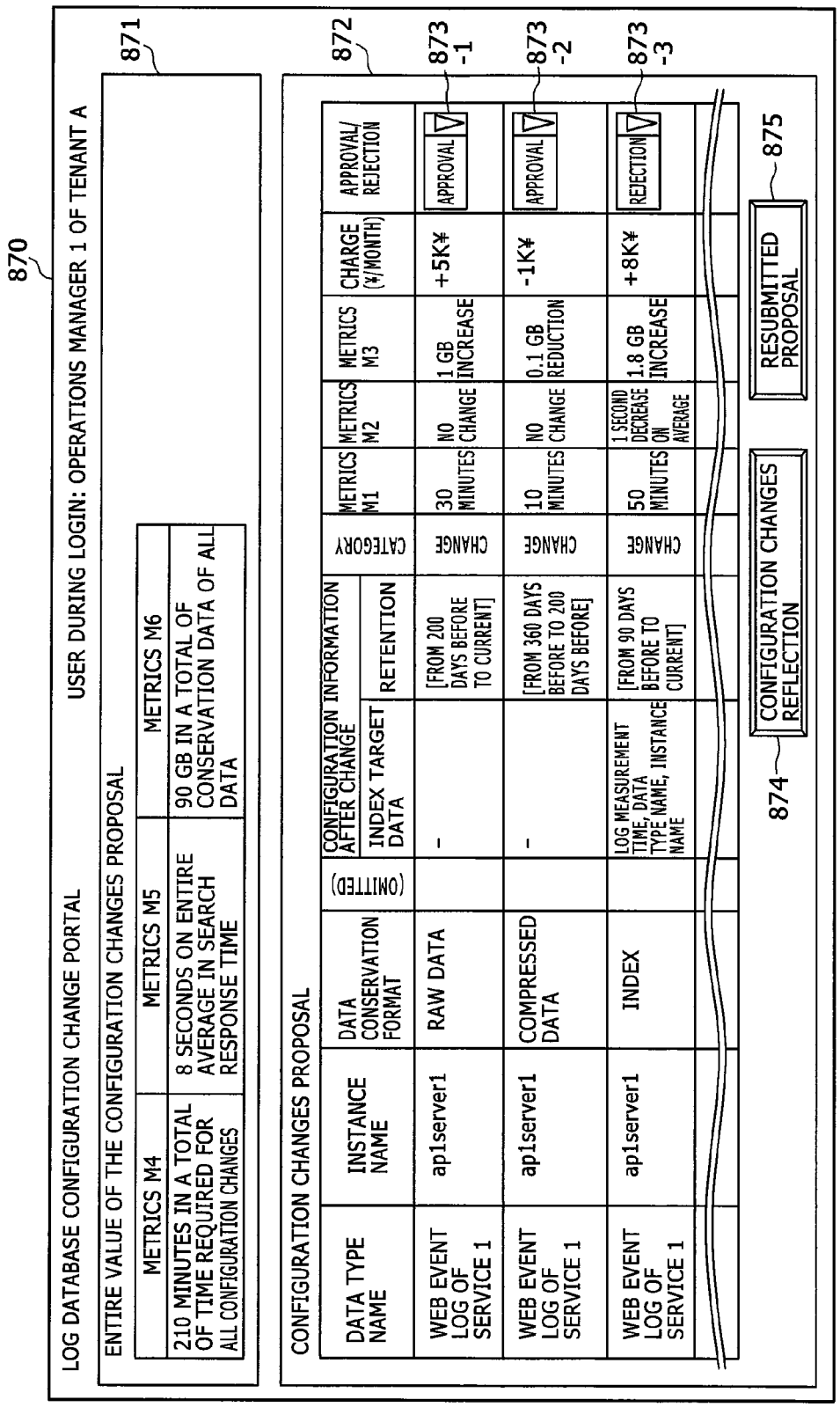
FIG. 20 is a diagram showing an example of configuration changes proposal recommended screen display in a first embodiment.

FIG. 20 is a drawing showing an example of a configuration changes recommended screen display that configuration changes proposal display unit 87 presents to an operations manager. The screen includes a screen for confirming the configuration changes proposal requested by the operations manager, and performing operation thereto. The recommended screen display 870 is constituted of entire metrics value display 871 of configuration changes difference information display 872 of the configuration changes proposal, approval or rejection selection button 873 of the configuration changes, configuration changes reflection button 874 and resubmitted proposal button 875. On entire index value display 871 of the entire metrics value T1300 of the configuration changes as previously evaluated is drawn. Moreover, on difference information display 872 of the configuration changes difference information T1100 of the configuration changes as previously generated in which the metrics is evaluated is drawn. Moreover, an increase and decrease of a charged amount from a monitoring platform provider corresponding to each of difference information to a tenant manager is simultaneously displayed. The operations manager can confirm the configuration changes content and an effect thereof, and an increase and decrease of cost by browsing the displays. Approval or rejection selection button 873 of the configuration changes includes interface for selecting "approval" or "rejection" to be made for the change for every configuration. The button is prepared for every row of difference information T1100 (873-1 to 873-3).

Then, symbols 874 and 875 refer to buttons for executing operation based on difference information T1100 and selection information of approval or rejection selection button 873. If configuration changes reflection button 874 is pressed down, the button 874 updates configuration and current configuration information T600 on log database 3 based on difference information T1100 and the selection information. If resubmitted proposal button 875 is pressed down, the button 875 regenerates configuration changes proposal based on difference information T1100 and selection information T1400. A method of the resubmitted proposal is described in detail in a second embodiment.

As described above, configuration changes proposal generating unit 82 according to the present invention automatically generates the configuration changes proposal using operation history T500, current configuration information T600 and data volume information T700. Moreover, the unit 82 presents metrics information to be a judgment source for the effect and the influence by the configuration changes. The operations manager can select configuration changes based on the metrics information using automatically generated configuration changes proposal. Therefore, the present invention is effective in allowing reduction of a man-hour of log database configuration examination work. Accordingly, the present invention is effective in allowing reduction of cost required for monitoring by an operator.

Moreover, in the present invention, configuration changes proposal are generated by analyzing a kind and a period of log data actually utilized from operation history T500. Thus, configuration in conformity with actually accessed data and period therefor can be generated. The present invention is effective in allowing ever-further reduction of unnecessary data on the log database by performing the configuration changes according to the proposal. Moreover, the present invention is effective in allowing suppression of loss caused by excessive log data deletion (fault correspondence man-hour increase, opportunity loss) that has been so far generated. Accordingly, an effect can also be expected in intensifying log monitoring of the monitoring platform by the operations manager.

Furthermore, in the present invention, configuration changes are generated using individual policy information and entire policy information presenting a request level that the operations manager requires for the configuration changes, thereby allowing recommendation of configuration changes proposal further in conformity with a request from the operational manager in comparison with a case where the information is not used. Therefore, the configuration changes can be generated with higher accuracy in comparison with the case where the information is not used. Moreover, the request is judged from two viewpoints of individual policy information T900 and entire policy information T800, thereby allowing generation of configuration changes proposal with higher accuracy in comparison with a case where only one of the information is used. Thus, recommendation with high accuracy is made, and thus an effect can be expected in allowing further reduction of a man-hour of log database configuration examination work by the operations manager.

In the present invention, tenant information T400 is used in generation of the configuration changes proposal. Thus, generation of the configuration changes proposal using delicate operation history T500 or policy information for every tenant can be performed. Therefore, accuracy of a configuration changes proposal can be further improved in comparison with a case where the information is not used. Therefore, the present invention is effective in allowing further reduction of a man-hour of log database configuration examination work by the operations manager.

Thus, cost required for log monitoring (in particular, management of the log database) by the operations manager of the monitoring platform can be reduced by assisting the configuration changes work in the present embodiment. In the present embodiment, first, the configuration changes proposal are automatically generated. Metrics information to be a judgment source for the effect and the influence by the configuration changes is presented. Thus, a man-hour of log database configuration examination work can be reduced. In the present embodiment, second, the configuration changes proposal are generated by analyzing a kind and a period of log data actually utilized from the operation history. Unnecessary data on the log database can be reduced by performing the configuration changes according to the proposal.

Moreover, log monitoring of the monitoring platform by the operations manager can be intensified. In the present execution form, the configuration changes proposal in conformity with utilization are generated. Therefore, loss caused by excessive log data deletion (fault correspondence man-hour increase, opportunity loss) that has been so far generated can be suppressed. Moreover, the configuration changes proposal in conformity with utilization are generated. Therefore, loss caused by excessive log data deletion (fault correspondence man-hour increase, opportunity loss) that has been so far generated can be suppressed.

In addition, in the first embodiment, an example is presented in which the configuration changes proposal of log database 3 are automatically generated on occasion of the request from the operations manager to present the configuration changes proposal to the operations manager, but the present invention can be executed even by a method without the aid of manpower by the operations manager. For example, on occasion of the management state on log database 3 exceeding a predetermined threshold in log configuration management server 8 (examples: a predetermined period elapsing after the configuration changes, or a data conservation amount reaching a predetermined level or more), the configuration changes proposal generation may be automatically performed and a process up to automatic reflection of the configuration may be executed.

Thus, the changes proposal of configuration information including time information is automatically generated for conservation of time-series data for every monitoring target by assisting the configuration changes work using the present Example. Therefore, waste of a resource of a time-series database of the monitoring platform can be reduced, and cost required for operations manager monitoring can be reduced.

[Embodiment 2]

Next, a second embodiment according to the present invention is described.

The second embodiment refers to an example in which the configuration changes proposal by the method described in the first embodiment are once presented to the operations manager, and then the configuration changes proposal are readjusted by inputting selection information on approval or no approval of the configuration changes by the operations manager.

Figure 21:
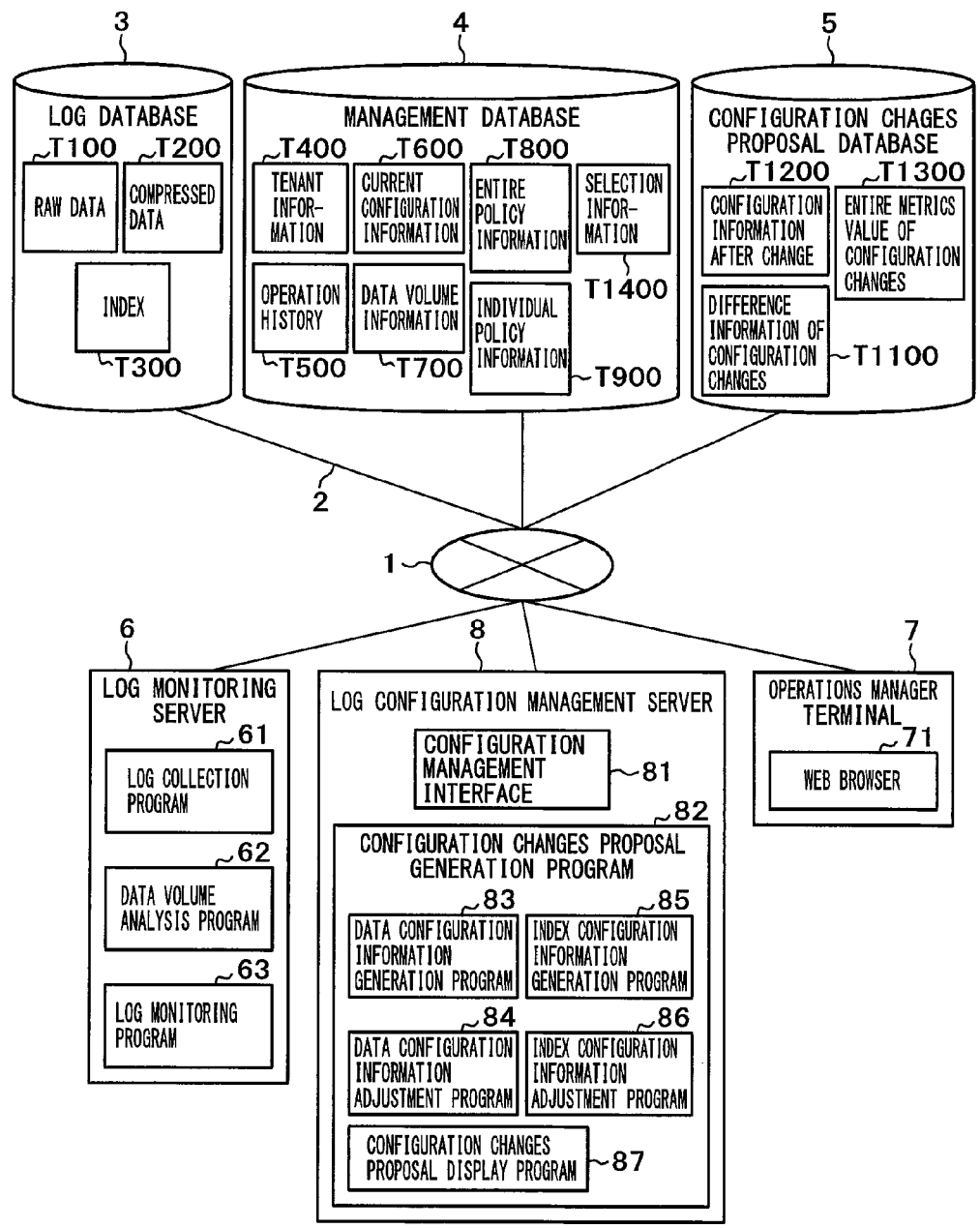
FIG. 21 is a diagram schematically showing a log database configuration automatic generation system related to a second embodiment according to the present invention.

FIG. 21 schematically shows a computer system assumed in a second embodiment. A constitution of the computer system is generally similar to the constitution in the first embodiment. However, the constitution is different in addition of selection information T1400 on management database 4, and addition of selection information analysis unit 88 on log configuration management server 8. Subsequently, only a different part is described, and the description on a part similar to the first embodiment is omitted.

Figure 22:
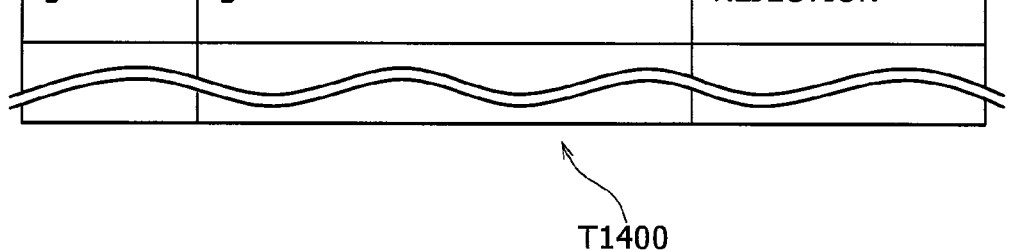
FIG. 22 is a diagram showing an example of selection information.

FIG. 22 shows one example of selection information T1400. Selection information T1400 includes data in which a result is recorded for an operations manager to select approval or rejection to a recommended screen display of configuration changes proposal as displayed by configuration changes proposal displaying unit 87. Column T1401 includes ID for uniquely identifying configuration of log database 3. The column is associated with column T1101 of difference information T1100 of the configuration changes. Column T1402 presents ID for uniquely specifying individual policy information T900 that the configuration meets. The column is associated with column T901 of individual policy information T900. Here, into the individual policy information that the configuration meets, a processing result in S215 during data configuration information adjustment processing, and a processing result in S409 during index configuration information adjustment processing 2375 are to be registered. Column T1403 includes a result of the operations manager selecting approval or rejection of change to the configuration. "Approval" when the change is approved, and "rejection" when the change is rejected are registered thereinto, respectively.

Figure 23:
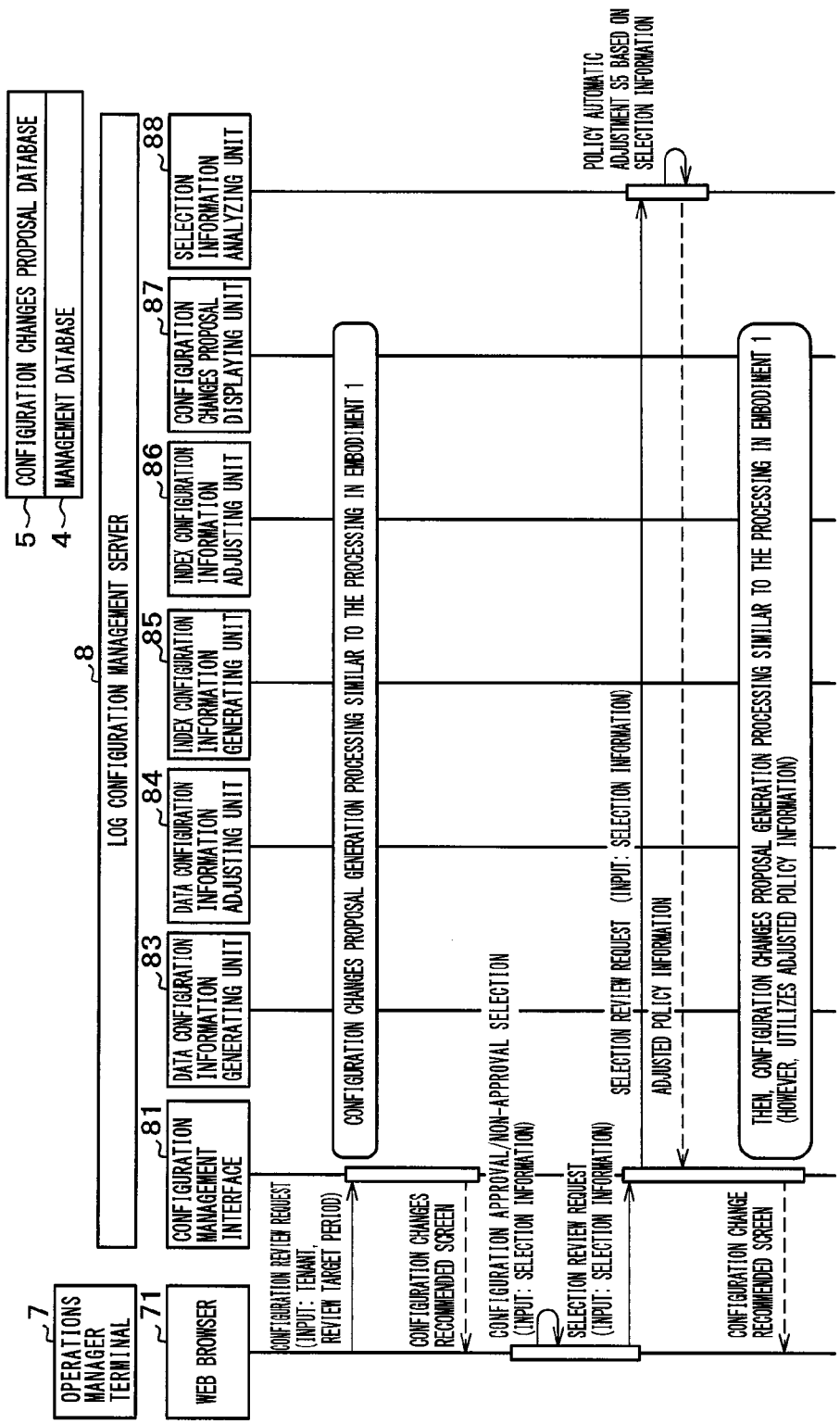
FIG. 23 shows a configuration changes readjustment sequence in a second embodiment.

FIG. 23 shows a sequence of readjustment of configuration changes proposal in a second embodiment. First, as a premise, configuration changes proposal generation processing is performed in a manner similar to the processing in the first embodiment. Further, the sequence is in a state in which recommended screen display 870 of generated configuration changes proposal is presented to an operations manager. In the state, the operations manager selects approval or rejection of each configuration changes on recommended screen display 870, and presses down resubmitted proposal button 875, and thus a configuration changes review request is made. If the configuration review request is made, selection information analysis unit 88 executes policy automatic adjustment processing S5 based on selection information T1400. Then, configuration changes proposal generating unit 82 reruns configuration changes proposal generation processing using adjusted policy information in a manner similar to the processing in the first embodiment.

Figure 24:
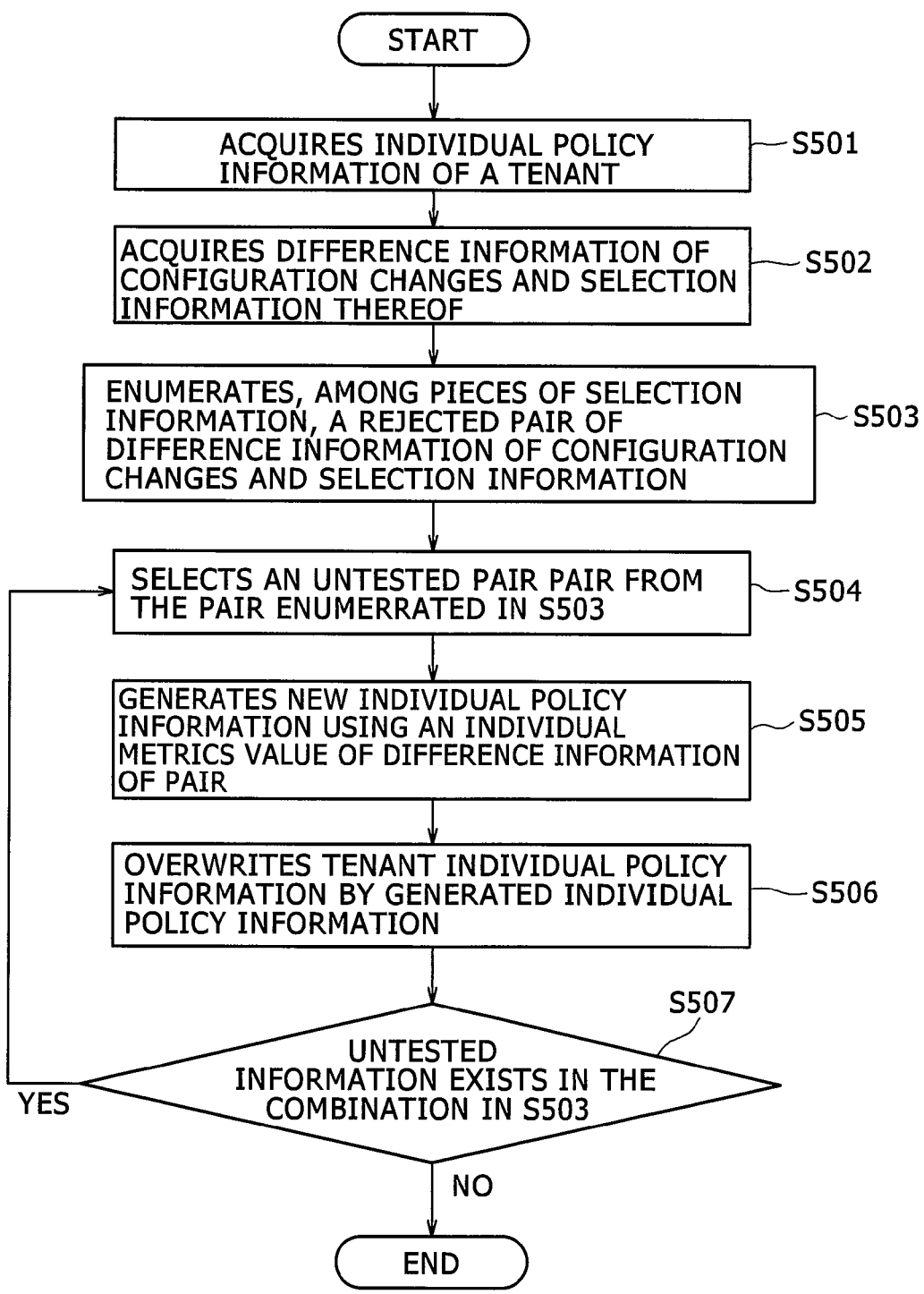
FIG. 24 shows a flowchart of policy information automatic adjustment processing of a selection information analysis unit in a second embodiment.

FIG. 24 shows a flowchart of automatic adjustment processing of policy information of selection information analysis unit 88 in a second embodiment. As one example of processing, the present embodiment presents an example for adjusting individual policy information T900. Adjusted individual policy information T900 may be temporarily used only during a readjustment request or may also be continuously used thereafter. In the example, the information is to be temporarily used only during the readjustment request. First, selection information analysis unit 88 acquires, upon configuration review request, individual policy information T900 of the tenant (S501). In the example, adjusted individual policy information T900 is, on the assumption that the information is temporarily used only during the readjustment request, to copy individual policy information T900 before adjustment, and retracted. Next, selection information analysis unit 88 acquires difference information T1100 of the configuration changes and selection information T1400 thereof of the tenant who requires for the change (S502). Furthermore, the unit 88 enumerates a pair of difference information T1100 of the configuration changes and selection information T1400 for configuration subjected to "rejection" among selection information T1400 (S503).

Subsequently, selection information analysis unit 88 repeats processing in S504 to S506 for the pair enumerated in S503.

Selection information analysis unit 88 selects an untested pair PAIR from the pair enumerated in S503 (S504). Next, selection information analysis unit 88 generates a new individual policy using an individual metrics value of difference information T1100 of PAIR (S505), and overwrites individual policy information T900 of a tenant by the new policy (S506). As a processing method in S505 to S506, for example, a method is applied in which a metrics value included in rejected difference information T1100 is compared with a value of individual policy information T900 that the configuration meets, and a severer value is used as a new value. Now, configuration T1152 of difference information T1100 exemplified in FIG. 16 is assumed to be "rejected." Moreover, the configuration T1152 is assumed to meet policy T951 of individual policy information T900 exemplified in FIG. 10. In the present case, based on rejected configuration T1152, the unit 88 updates "time required for configuration changes" from "less than 60 minutes" to "less than 50 minutes" for the policy, "criterial response time change with configuration changes" from "1 second or more decrease" to "12 seconds or more decrease" and "data volume change with configuration changes" from "unlimited" to "less than 18 GB in an increase." If a plurality of configurations meeting identical individual policy information are rejected, configuration is updated on severer conditions by repetition processing. However, the description is taken as one example, and therefore another processing method may be applied. For example, a method may be applied in which loosest conditions are applied among a plurality of configurations values that meet identical individual policy information and are rejected, or a method may also applied in which an average of the values is used.

Moreover, the unit 88 records only data in latest configuration changes in selection information T1400 in the present example. However, a method may also be applied in which selection information T1400 of plural times of past configuration changes is recorded to extract only rejected configuration information therefrom, and an average of the configuration values is used.

As described above, configuration changes proposal generating unit 82 generates and presents configuration changes proposal as in Embodiment 1, and re-recommends configuration changes proposal using selection information T1400 to the proposal. Thus, the operations manager can try any other recommendation method, when the recommendation made by configuration changes proposal generating unit 82 is not useful. On the occasion, configuration changes proposal in conformity with a current request from the operations manager can be recommended by giving selection information T1400 as an input. The process is effective in allowing further reduction of a man-hour of log database configuration examination work by the operations manager.

[Embodiment 3]

Next, the third embodiment according to the present invention is described.

The third embodiment refers to an example for performing weighing in accordance with an importance degree of service to be a monitoring target during configuration changes proposal generation of log database 3 in the first embodiment.

Figure 25:
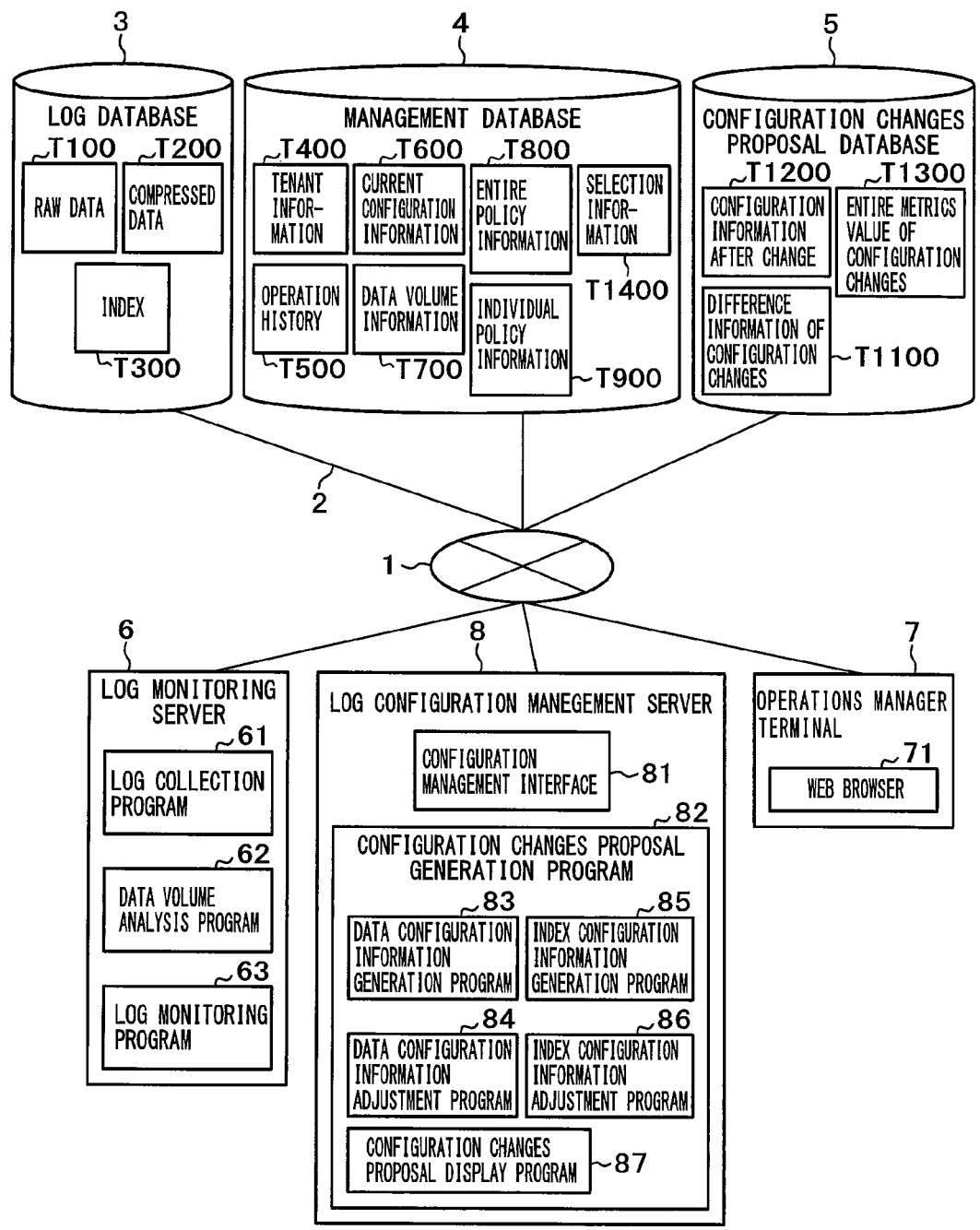
FIG. 25 is a diagram schematically showing a log database configuration automatic generation system related to a third embodiment according to the present invention.

FIG. 25 schematically shows a computer system assumed in a third embodiment. A constitution of the computer system is generally similar to the constitution in the first embodiment. However, the constitution is different in addition of service information T1500 and fault information T1600 on management database 4, and addition of importance degree analysis unit 89 on log configuration management server 8. Subsequently, only a different part is described, and the description on a part similar to the first embodiment is omitted.

FIG. 26 shows one example of service information T1500. Service information T1500 includes information on monitoring of each service of each tenant, and data presenting a role and an importance degree of service. Service information T1500 is assumed to be preliminarily input. Column T1501 includes a tenant name managing service. Column T1502 includes a name for uniquely specifying service. For example, names such as "service 1" and "service 1 demonstration" are registered. Columns T1503 and T1504 include information on monitoring of each service of each tenant. Column T1503 includes a list of data type names for monitoring the service. In the column, all of data type names for the service are enumerated, for example, "Web event log of service 1, CPU utilization rate of OS, . . . ." Each data type name in the column is corresponded to a data type name on any other table, such as column T104 of raw data T100. Column T1504 includes a list of instance names for provision of the service. In the column, all of instance names for provision of the service are enumerated, for example, "ap1server1, ap1server2, ap1db1 . . . ." Each instance name in the column is corresponded to an instance name on any other table, such as column T105 of raw data T100. Columns T1505 and T1506 include data presenting a role and an importance degree of service. Column 1505 presents the role of service. For example, data presenting the role of the service, such as "Web Service production environment" and "trial environment" are registered. Column T1505 includes the importance degree of the service. An importance degree according to the role of the service is registered into the importance degree. In the present example, the importance degree is expressed as a numeric value between "0 and 1." Moreover, the importance degree is to be higher as the value is larger. In the present example, the importance degree of service is preliminarily given, but may be determined by calculation from any other information. For example, the importance degree may be determined from a calculation expression using an end user count using the service as an input. Moreover, in the present example, the role and the importance degree are determined for every service, but may be determined for every instance. For example, "AP server" or "DB server" may be registered as the role of the instance, and the importance degree may be determined according to the value.

FIG. 27 shows one example of fault information T1600. Fault information T1600 includes data for presenting a record of fault occurrence of each service. Columns T1601 and T1602 include a tenant name and a service name, respectively. The columns are associated with columns T1501 and T1502 of service information T1500. Column T1603 includes fault occurred time. In the column, time on which a fault of service is generated is recorded. Column T1604 includes a data type name used for root cause analysis. Moreover, column T1605 includes an instance name causing the fault. Data in columns T1604 and T1605 are associated with a data type name and an instance name, such as columns T103 and T104 of raw data T100, respectively.

Figure 28:
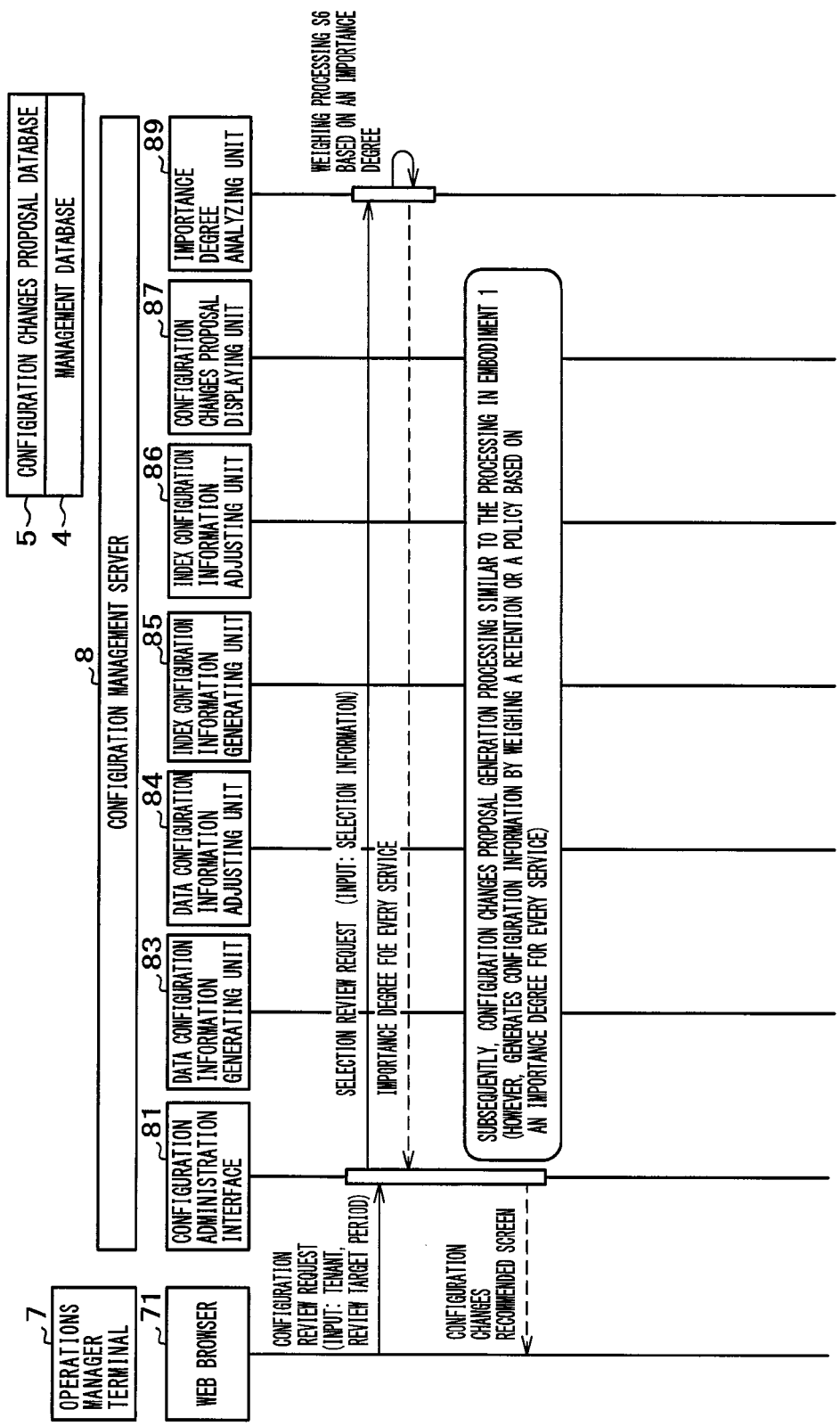
FIG. 28 shows configuration changes proposal generation sequence in a third embodiment.

FIG. 28 shows a sequence of configuration changes proposal generation in the third embodiment. Importance degree analysis unit 89 calculates, upon configuration changes proposal review request from an operations manager, an importance degree of service using service information T1500 or fault information T1600 or both thereof (S6). Next, the unit 89 executes configuration changes proposal generation processing similar to the processing in Embodiment 1. However, a value weighed according to the importance degree is used for a configuration value of retention on configuration information. Moreover, the value weighed according to the importance degree is also used for individual policy information T900 in a similar manner.

Hereinafter, an example of an analytical method for the importance degree by importance degree analysis unit 89 is given. Here, an example for calculating the importance degree for every monitoring target is presented as the importance degree of service. For example, as a method for calculating the importance degree from service information T1500, a method is conceivable in which all rows including the monitoring target are extracted from service information T1500 to calculate an average of the importance degree T1506, and the value is determined as the importance degree of the monitoring target. Moreover, as a method for calculating the importance degree from fault information T1600, for example, a method is conceivable in which occurrence frequency of a fault during a review target period is tabulated for every monitoring target to treat height of the frequency as the importance degree.

Importance degree analysis unit 89 calculates the importance degree for every monitoring target, and then configuration changes proposal generating unit 82 performs configuration information generation processing in consideration of the importance degree. The fundamental processing content is similar to the content in Embodiment 1. However, the content is different in weighing according to the importance degree a configuration value of configuration information and each criterial value of policy information as generated. For example, in processing S108 and S313 in which retention is configured, calculation is made by multiplying a log utilization day count of the retention by a weighing factor that becomes longer in the period accordingly as the importance degree of the monitoring target is higher (example: retention=log utilization day count×(importance degree+1)). In a similar manner, calculation is also made by multiplying individual policy information T900 by the weighing factor according to the importance degree of the monitoring target (example: data volume conditions are further relieved accordingly as the importance degree is higher).

As described above, configuration changes proposal generating unit 82 performs weighing according to the importance degree to generate configuration changes proposal, thereby allowing conservation of more important log data for a longer period in comparison with the case in Embodiment 1. Therefore, loss caused by excessive log data deletion (fault correspondence man-hour increase, opportunity loss) that has been so far generated can be further suppressed in more important service and log data. Accordingly, the present invention is effective in allowing further intensification of log monitoring of the monitoring platform by the operations manager.

In the first to the second embodiments as described above, the description is made for configuration changes proposal generation processing regarding raw data configuration information, compressed data configuration information and index configuration information. However, the embodiment according to the present invention is not limited to the configuration information generation. Therefore, the present invention may be applied to configuration information generation of other than the description above. For example, when configuration for caching a result obtained by analyzing a plurality of log data exists, the present invention may also be applied to configuration changes proposal generation of the configuration information.

As described above, the embodiments according to the present invention are described in full detail with reference to drawings, but a specific constitution is not limited to the embodiments, and includes a design or the like in the range without departing from the scope of the present invention.

What is claimed is:

1. A time-series database configuration automatic generation system comprising:
   a time-series database storing time-series data of a plurality of monitoring targets, where each of the monitoring targets respectively comprises a tenant, a data type, and one or more names that identify equipment of the tenant; and
   a monitoring server including a processor connected to the time-series database and a memory connected to the processor, the memory storing instructions that, when executed by the processor, cause the processor to:
      store configuration information for the time-series data and stores policy information for each of the respective monitoring targets which include metrics that describe conditions required to be met by a request to change the configuration information of the time-series data,
      store the time-series data in the time-series database for the monitoring targets and to search the time-series data stored in the time-series database,
      manage the configuration information regarding a kind and a conservation format of the time-series data which is stored for each of the monitoring targets,
      generate a proposal to change the configuration information including time information regarding each of the monitoring targets based on current configuration information of the time-series database, an operation history of the time-series data, and an amount of the time-series data,
      generate metrics which quantify effects of the proposal to change the configuration information for each of the monitoring targets,
      compare the metrics in the policy information with the generated metrics of the proposal to change the configuration information,
      judge whether the proposal to change the configuration information satisfies the policy information,
      when the policy information is satisfied, display the generated metrics together with the proposal to change the configuration information on a terminal of an operations manager of the tenant for each of the monitoring targets,
      request approval of the operations manager of the tenant for the proposal displayed on the terminal, and
      register the change to the configuration information as new configuration information after approval by the operations manager of the tenant.

2. The time-series database configuration automatic generation system according to claim 1, wherein the memory further stores instructions that when executed by the processor causes the processor to:
   record whether the operations manager has approved or rejected the proposal as selection information,
   analyze the request to change the configuration information using the selection information, and update the policy information based on the result of analysis, and
   wherein the proposal is generated using the updated policy information.

3. The time-series database configuration automatic generation system according to claim 1, wherein the memory further stores instructions that when executed by the processor causes the processor to:
   calculate an importance degree of the monitoring targets in advance, and
   weigh a configuration value of the configuration information of the time-series database or the policy information according to the calculated importance degree.

4. The time-series database configuration automatic generation system according to claim 3, wherein the memory further stores instructions that when executed by the processor causes the processor to:
   store information on monitoring of each service of each tenant, and service information in which data presenting a role and an importance degree of the service are preliminarily described, for each of the monitoring targets, and
   calculate the importance degree using the service information.

5. The time-series database configuration automatic generation system according to claim 3, wherein the memory further stores instructions that when executed by the processor causes the processor to:
   store fault information in which fault occurrence is recorded for each service of each of the monitoring targets, and
   calculate the importance degree using the fault information.

6. The time-series database configuration automatic generation system according to claim 1,
wherein the metrics of the policy information include, for each of the respective monitoring targets, a time required for any change to the configuration information, a performance threshold for any change to the configuration information, and a data storage amount for any change to the configuration information, and wherein the memory further stores instructions that when executed by the processor causes the processor to:
generate difference information for each of the metrics of the policy information in connection with the proposal,
generate information on an increase and decrease of a charged amount to the tenant corresponding to the difference information, and
display a result thereof together with the proposal on the terminal of the operations manager of the tenant.

7. The time-series database configuration automatic generation system according to claim 1,
wherein the proposal is generated in conformity with data actually accessed by the tenant, wherein the memory further stores instructions that when executed by the processor causes the processor to:
acquire, upon receiving a configuration review request from the tenant, an operation history during a designated review target period of the tenant, and generating data configuration information, and
wherein the proposal is generated in response to the configuration review request, and the policy information is preset.

8. A time-series database configuration automatic generation method in a data search system which includes a time-series database storing time-series data of a plurality of monitoring targets, where each of the monitoring targets respectively comprises a tenant, a data type, and one or more names that identify equipment of the tenant, and a monitoring server using the time-series database, and the monitoring server stores configuration information for the time-series data and stores policy information for each of the respective monitoring targets which include metrics that describe conditions required to be met by a request to change the configuration information of the time-series data, the method comprising:
managing the configuration information regarding a kind and a conservation format of the time-series data which is stored for each of the monitoring targets,
generating a proposal to change the configuration information including time information regarding each of the monitoring targets based on current configuration information of the time-series database, an operation history of the time-series data, and an amount of the time-series data;
generating metrics which quantify effects of the proposal to change the configuration information for each of the monitoring targets;
comparing the metrics in the policy information with the generated metrics of the proposal to change the configuration information;
judging whether the proposal to change the configuration information satisfies the policy information;
when the policy information is satisfied, displaying the generated metrics together with the proposal to change the configuration information on a terminal of an operations manager of the tenant for each of the monitoring targets;
requesting approval or rejection of the operations manager of the tenant for the proposal displayed on the terminal;
registering the change to the configuration information as new configuration information after approval by the operations manager of the tenant; and
displaying on the terminal of the operations manager of the tenant difference information of the metrics in the policy information and the generated metrics of the proposal, and an increase or decrease amount of a charged amount to a manager of the tenant corresponding to the difference information.

9. A monitoring server using a time-series database, the time-series database storing time-series data of a plurality of monitoring targets, where each of the monitoring targets respectively comprises a tenant, a data type, and one or more names that identify equipment of the tenant, the monitoring server comprising:
a processor connected to the time-series database; and
a memory connected to the processor and which stores instructions that, when executed by the processor, configure the processor to:
store configuration information for the time-series data and store policy information for each of the respective monitoring targets which include metrics that describe conditions required to be met by a request to change the configuration information of the time-series data,
store the time-series data in the time-series database for the monitoring targets according to the configuration information and search the time-series data stored in the time-series database,
manage the configuration information regarding a kind and a conservation format of the time-series data which is stored for each of the monitoring targets,
generate a proposal to change the configuration information including time information regarding each of the monitoring targets based on current configuration information of the time-series database, an operation history of the time-series data, and an amount of the time-series data,
generate metrics which quantify effects of the proposal to change the configuration information for each of the monitoring targets,
compare the metrics in the policy information with the generated metrics of the proposal to change the configuration information,
judge whether the proposal to change the configuration information satisfies the policy information,
when the policy information is satisfied, display the generated metrics together with the proposal to change the configuration information on a terminal of an operations manager of the tenant for each of the monitoring targets, and
generate and display difference information of the metrics in the policy information and the generated metrics of the proposal, and information on an increase or decrease of the charged amount to the tenant corresponding to the difference information on the terminal of the operations manager of the tenant.

* * * * *